US007503205B2

(12) United States Patent
Baillargeon et al.

(10) Patent No.: US 7,503,205 B2
(45) Date of Patent: Mar. 17, 2009

(54) REDUNDANT VACUUM SOURCE FOR SECONDARY CONTAINMENT MONITORING AND LEAK DETECTION SYSTEM AND METHOD

(75) Inventors: Jeremy R. Baillargeon, Plainville, CT (US); David J. Bolt, Newry, PA (US)

(73) Assignee: Veeder-Root Company, Simsbury, CT (US)

( * ) Notice: Subject to any disclaimer, the term of this patent is extended or adjusted under 35 U.S.C. 154(b) by 273 days.

(21) Appl. No.: 11/472,922

(22) Filed: Jun. 22, 2006

(65) Prior Publication Data

US 2006/0277976 A1 Dec. 14, 2006

Related U.S. Application Data

(63) Continuation-in-part of application No. 11/411,182, filed on Apr. 25, 2006.

(60) Provisional application No. 60/674,743, filed on Apr. 26, 2005.

(51) Int. Cl.
*G01M 3/04* (2006.01)

(52) U.S. Cl. .......................... 73/40; 73/40.5 R; 73/49.2

(58) Field of Classification Search ...................... 73/40, 73/40.5 R, 49.2, 49.3, 46, 49.1, 49.5
See application file for complete search history.

(56) References Cited

U.S. PATENT DOCUMENTS 1,431,768 A 10/1922 Wyckoff et al.

3,133,667 A 5/1964 Garrett
4,457,349 A 7/1984 Vazin (Continued)

FOREIGN PATENT DOCUMENTS

DE G8632565.5 4/1987

(Continued)

OTHER PUBLICATIONS

International Search Report and Written Opinion dated Oct. 9, 2006, Patent Application No. PCT/US2006/015707 published as WO 2006/116443 A3, International Filing Date Apr. 26, 2006.

(Continued)

*Primary Examiner*—Daniel S Larkin
(74) *Attorney, Agent, or Firm*—Nelson Mullins Riley & Scarborough LLP

(57) ABSTRACT

A redundant vacuum-generating source system and method for generating and/or maintaining a vacuum level in a secondarily contained fuel-handling component that is monitored for leaks. The vacuum-generating source is coupled to upstream fuel-handling components to draw a vacuum level in their interstitial spaces. Other downstream fuel-handling components are drawn under a vacuum by tapping off of the upstream fuel-handling component's interstitial spaces for convenience. A series of valves control which upstream fuel-handling component's interstitial spaces are coupled to a downstream fuel-handling component interstitial space. In the event that an upstream fuel-handling component contains a leak, a control system can control the valves to switch the vacuum generation of a downstream fuel-handling component to another upstream fuel-handling component that does not contain a leak so that a sufficient vacuum level can be generated in downstream fuel-handling component(s) to monitor it for leaks.

30 Claims, 19 Drawing Sheets

U.S. PATENT DOCUMENTS

| | | | |
|---|---|---|---|
| 4,762,440 A | 8/1988 | Argandona |
| 4,842,163 A | 6/1989 | Bravo |
| 4,842,443 A | 6/1989 | Argandona |
| 4,989,634 A | 2/1991 | Rieseck |
| 4,997,012 A | 3/1991 | Kuziw |
| 5,013,434 A | 5/1991 | Furrow |
| 5,027,849 A | 7/1991 | Diesener |
| 5,042,577 A | 8/1991 | Suzumura |
| 5,058,774 A | 10/1991 | Hartman et al. |
| 5,163,467 A | 11/1992 | Coe |
| 5,167,470 A | 12/1992 | Bertolozzi et al. |
| 5,244,307 A | 9/1993 | Wokas |
| 5,246,044 A | 9/1993 | Robertson et al. |
| 5,257,652 A | 11/1993 | Lawrence |
| 5,285,829 A | 2/1994 | Bravo |
| 5,301,722 A | 4/1994 | Todd et al. |
| 5,341,857 A | 8/1994 | Bravo |
| 5,400,924 A | 3/1995 | Brodie |
| 5,429,274 A | 7/1995 | Vlaskamp |
| 5,514,920 A | 5/1996 | Key |
| 5,527,130 A | 6/1996 | Webb |
| 5,529,098 A | 6/1996 | Bravo |
| 5,544,518 A | 8/1996 | Hart et al. |
| 5,550,532 A | 8/1996 | Marshall |
| H1676 H | 9/1997 | Marshall |
| 5,676,183 A | 10/1997 | Bravo |
| 5,687,871 A | 11/1997 | Pettesch |
| 5,713,607 A | 2/1998 | Webb |
| 5,717,564 A | 2/1998 | Lindale |
| 5,819,975 A | 10/1998 | Pendleton et al. |
| 5,851,108 A | 12/1998 | Clymer et al. |
| 6,273,021 B1 | 8/2001 | Pembroke |
| 6,283,173 B1 | 9/2001 | Osborne |
| 6,311,547 B1 | 11/2001 | Nitecki |
| 6,340,269 B1 | 1/2002 | Stanton et al. |
| 6,575,206 B2 | 6/2003 | Struthers et al. |
| 6,622,757 B2 | 9/2003 | Hart et al. |
| 6,659,143 B1 | 12/2003 | Taylor et al. |
| 6,834,534 B2 | 12/2004 | Halla et al. |
| 6,977,042 B2 | 12/2005 | Kadel et al. |
| 6,978,660 B2 | 12/2005 | Hutchinson et al. |
| 6,978,661 B2 | 12/2005 | Hutchinson et al. |
| 6,997,042 B2 | 2/2006 | Hutchinson et al. |
| 7,010,961 B2 | 3/2006 | Hutchinson et al. |
| 7,076,994 B2 | 7/2006 | Hutchinson et al. |
| 2003/0047211 A1 | 3/2003 | Bravo et al. |
| 2003/0230592 A1 | 12/2003 | Hutchinson |
| 2004/0045343 A1 | 3/2004 | Hutchinson |
| 2004/0149017 A1 | 8/2004 | Hutchinson |
| 2004/0182136 A1 | 9/2004 | Halla et al. |
| 2004/0234338 A1 | 11/2004 | Monroe et al. |
| 2004/0261503 A1 | 12/2004 | Hutchinson et al. |
| 2004/0261504 A1 | 12/2004 | Hutchinson et al. |
| 2005/0039518 A1 | 2/2005 | Hutchinson et al. |
| 2005/0145015 A1 | 7/2005 | Hutchinson et al. |
| 2005/0145016 A1 | 7/2005 | Hutchinson et al. |
| 2005/0236044 A1 | 10/2005 | Hutchinson et al. |
| 2005/0236045 A1 | 10/2005 | Hutchinson et al. |
| 2005/0247111 A1 | 11/2005 | Hutchinson et al. |
| 2006/0191568 A1 | 8/2006 | Bolt et al. |
| 2006/0191569 A1 | 8/2006 | Bolt et al. |
| 2006/0249204 A1 | 11/2006 | Bolt et al. |
| 2006/0260387 A1 | 11/2006 | Baillargeon et al. |
| 2006/0260680 A1 | 11/2006 | Reid et al. |

FOREIGN PATENT DOCUMENTS

| | | |
|---|---|---|
| DE | 3821408 C1 | 3/1990 |
| DE | 4420795 A1 | 12/1994 |
| WO | WO2006116443 A3 | 11/2006 |

OTHER PUBLICATIONS

International Preliminary Report on Patentability dated Nov. 8, 2007, Patent Application No. PCT/US2006/015707 published as WO 2006/116443 A3, International Filing Date Apr. 26, 2006.

REDUNDANT VACUUM SOURCE FOR SECONDARY CONTAINMENT MONITORING AND LEAK DETECTION SYSTEM AND METHOD

RELATED APPLICATION(S)

This application is a Continuation-In-Part of U.S. patent application Ser. No. 11/411,182, now pending, entitled "VACUUM-ACTUATED SHEAR VALVE DEVICE, SYSTEM, AND METHOD, PARTICULARLY FOR USE IN SERVICE STATION ENVIRONMENTS," filed on Apr. 25, 2006, and claims priority to this application and U.S. Provisional Patent Application No. 60/674,743 entitled "VACUUM-OPERATED SHEAR VALVE WITH FLOAT AND SERVICE SWITCH AND FILTER INTERLOCK DEVICE, SYSTEM, AND METHOD," filed on Apr. 26, 2005, both of which are incorporated herein by reference in their entireties.

This application is also related to U.S. Pat. Nos. 6,834,534; 6,977,042; 6,978,660; 6,978,661; and 7,010,961, U.S. Patent Application Publication Nos. 2004/0045343 A1; 2005/0039518 A1; 2005/0145015 A1; 2005/0145016 A1; 2005/0247111 A1; 2005/0236044 A1; and 2005/0236045 A1; U.S. patent application Ser. Nos. 11/255,421 now U.S. Pat. No. 7,076,994; 11/354,394; and 11/354,886; and U.S. Provisional Patent Application No. 60/654,390; all of which are incorporated herein by reference in their entireties.

FIELD OF THE INVENTION

The present invention is related to a secondary containment monitoring and control system for monitoring secondarily-contained fuel-handling components for leak detection and prevention. Various control devices are employed to control the fuel-handling components and fuel flow in response to a leak or other alarm or safety condition to mitigate the potential for leaking fuel to the environment.

BACKGROUND OF THE INVENTION

In service station environments, fuel is typically delivered to fuel dispensers from underground storage tanks (USTs), sometimes referred to as fuel storage tanks. USTs are large containers located beneath the ground that hold fuel. A separate UST is provided for each fuel type, such as low octane gasoline, high-octane gasoline, and diesel fuel. In order to deliver the fuel from the USTs to the fuel dispensers, a submersible turbine pump (STP) is typically provided that pumps the fuel out of the UST and delivers the fuel through a main fuel piping conduit that runs beneath the ground in the service station. Other types of pumps other than a STP, such as a self-contained pump within the dispenser housing for example, may be employed.

Due to environmental and possible regulatory requirements governing service stations, fuel-handling components that handle fuel or vapor and would leak the fuel or vapor to the environment if a leak existed may need to be secondarily contained. Examples of fuel-handling components include, but are not limited to fuel storage tanks, fuel piping conduits that carry fuel, STPs, main fuel piping, branch fuel piping, sumps, shear valves, and dispenser piping. Secondary containment is typically provided in the form of a sealed outer piping or outer container that surrounds the fuel-handling component whereby a space, called an "interstitial space" is formed between the fuel-handing component and the outer container or piping. If a leak occurs in the fuel-handling component, the leak is trapped in the interstitial space provided by the outer piping or outer container. Thus, the leak is prevented from leaking to the environment. The secondary containment must periodically be checked and evacuated.

It is possible that the secondary containment could also contain a leak unknown to service station operators. In this instance, if a leak were to occur in a fuel-handling component, the leak may escape to the environment through the leak in the secondary containment. For example, if the fuel-handling component is a double-walled fuel piping, wherein an outer piping surrounds and inner piping that carries fuel, and a leak exists in both the inner and outer piping, fuel from the inner piping may leak to the environment through the outer piping. Thus, without monitoring of the interstitial spaces provided by the secondary containment, it is possible that a leak can occur to the environment without being detected. The STP will continue to operate as normal, drawing fuel from the UST and providing fuel to the source of the leak.

Recent proposed changes in state and federal regulations will tighten the requirements to contain leaks via secondary containment and will further require better leak detection so that environmental damage may be minimized. As a result, it is becoming imperative that all potential leak sources be evaluated and steps taken to detect and contain leaks in the piping systems. If the interstitial space of the secondarily contained fuel-handling components can be monitored to detect a leak or breach in either the fuel-handling component or the outer containment, a breach can typically be detected before the leak could escape to the environment.

One method of monitoring the interstitial space of secondarily contained fuel-handling components for leaks is by drawing a vacuum level in the interstitial space. Examples of such systems are the aforementioned U.S. Pat. Nos. 6,834,534; 6,977,042; 6,978,661; and 7,010,961, U.S. Patent Application Publication Nos. 2004/0045343 A1; 2005/0039518 A1; 2005/0145015 A1; 2005/0145016 A1; and 2005/0247111 A1; and U.S. patent application Ser. No. 11/255,421, now U.S. Pat. No. 7,076,994. In these systems, a vacuum-generating source, which may be from a siphon port on the STP for example, draws a vacuum in the interstitial space. Thereafter, the interstitial space is monitored for pressure variations. If a sufficient pressure variation occurs, this is an indication that either the fuel-handling component or the outer containment has incurred a leak or breach due to the ingress or egress of fuel and/or air into the interstitial space either from the fuel-handling component or from the outside air.

Because fuel-handling components are coupled to each other to complete the fuel flow path from the storage tank until eventually delivery of the fuel through a hose and nozzle of a fuel dispenser, fuel-handling components may be provided with fittings that allow their interstitial spaces to be coupled to each other automatically when attached. This allows the interstitial spaces of these fuel-handling components to be drawn under a vacuum level from a common vacuum-generating source as a convenience and for cost savings. The vacuum-generating source will generate a vacuum level in a first fuel-handling component, and other fuel-handling components attached downstream of the first fuel-handling component will receive the vacuum thereafter as it travels in the interstitial space flow path. For example, see previously referenced U.S. patent application Ser. Nos. 11/354,886 and 11/354,394 that provide for an interstitial space of a shear valve to be coupled to interstitial spaces in double-walled branch fuel piping and internal fuel dispenser piping when connected.

However, if a leak occurs in a first fuel-handling component, one or more downstream fuel-handling components may not receive a sufficient vacuum level. Thus, the downstream fuel-handling components cannot be monitored for leaks due to a leak in another of the fuel-handling components located upstream. Thus, it is desirable to provide a system and method to provide a redundant vacuum source or level for such downstream fuel-handling components so that they can continue to be monitored for leaks even if upstream fuel-handling components contain a leak.

SUMMARY OF THE INVENTION

The present invention is a redundant vacuum-generating source system and method for generating and/or maintaining a vacuum level in a secondarily contained fuel-handling component that is monitored for leaks. The vacuum-generating source is coupled to upstream fuel-handling components to draw a vacuum level in their interstitial spaces. Other downstream fuel-handling components are drawn under a vacuum by tapping off the upstream fuel-handling component's interstitial spaces for convenience. A series of valves control which upstream fuel-handling component's interstitial spaces are coupled to a particular downstream fuel-handling component interstitial space. In the event that an upstream fuel-handling component contains a leak, a control system can control the valves to switch the vacuum generation of a downstream fuel-handling component to another upstream fuel-handling component that does not contain a leak so that a sufficient vacuum level can be generated in the downstream fuel-handling components to monitor it for leaks.

In one embodiment, the upstream fuel-handling component is fuel piping that provides fuel to the fuel dispenser and is coupled to the output of a shear valve. The downstream fuel-handling component is a secondarily contained in-dispenser pan or sump that is designed to capture leaks from fuel-handling components located above the in-dispenser pan. The in-dispenser pan interstitial space is coupled to the fuel piping interstitial space. In this manner, when the vacuum-generating source generates a vacuum level in the fuel piping, the vacuum level will also be generated in the in-dispenser interstitial space.

The in-dispenser sump interstitial space is coupled to multiple fuel piping interstitial spaces to provide redundancy in the vacuum source for the in-dispenser sump. Latching valves under control of a control system dictate which fuel piping interstitial space is coupled to the in-dispenser sump interstitial space. Only one source is allowed at a time, and thus only one of the latching valves is opened. If the control system detects a leak in the current fuel piping interstitial space that is supplying the vacuum source to the in-dispenser sump interstitial space, the control system can automatically switch the latching valves to change the source to another fuel piping that does not contain a leak. In this manner, the in-dispenser sump can be continued to be drawn under a vacuum level and monitored for leaks independent of a particular fuel piping containing a leak. If only one fuel piping was capable of providing the source of vacuum level to the in-dispenser interstitial space, the in-dispenser interstitial space could not be continuously monitored for leaks if the fuel piping contained a leak.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

In general, the present invention is a secondary containment monitoring and control system employing various features and enhancements to control vacuum level used for monitoring and detecting leaks in secondarily contained fuel-handling components. The secondary containment monitoring system provides a vacuum-generating source that generates a vacuum level in interstitial spaces of fuel-handling components formed as a result of space provided between an inner fuel-carrying component surrounded by an outer secondary containment. The pressure variations of the interstitial space are monitored for possible leaks. When a leak is detected the system controls vacuum replenishment and/or the automatic closing of a vacuum actuated product line shear valve. Thus, the source of fuel is cut off from the potential leak source.

Examples of related and predecessor systems are provided in U.S. Patent Application Publication Nos. US 2004/0045343 A1; US 2005/0039518 A1; US 2005/0145016 A1; and US 2005/0247111 A1; U.S. Pat. Nos. 6,834,534; 6,997,042; 7,010,961; 6,978,660; and 6,978,661 (hereinafter the "'343 application," "'581 application," "'016 application," "'111 application," "'534 patent," "'042 patent," "'961 patent," "'660 patent," and the "'661 patent," respectively), all of which are incorporated herein by reference. The '534 patent monitors the secondary containment of a fuel storage tank. The '343, '518, '016, and '111 applications monitor the secondary containment of fuel piping. The '961 and '042 patents monitor the secondary containment of the submersible turbine pump head and its riser pipe. The '661 patent monitors the secondary containment of internal dispenser fuel piping and a shear valve coupled to the internal fuel dispenser piping. The present application provides additional components and features that go beyond the teachings of the aforementioned patents to provide certain features as improvements to such secondary containment monitoring systems.

There are several goals of the improved secondary containment monitoring and control system according to the present invention. One goal is to allow a common vacuum-generating source to generate a vacuum level to the interstitial space of different fuel-handling components. A second goal is to detect if a product line's interstitial space contains a blockage such that a leak would go undetected if the leak existed on the downstream side of the blockage. A third goal is to provide control to automatically close the product line shear valves in response to a leak detected in order to prevent fuel from further leaking in the event of a shear or loss of vacuum indicative of a leak in a fuel-handling component. A fourth goal is to provide a monitoring of an in-dispenser sump having a secondary containment system and a redundant vacuum source generated for the in-dispenser sump in case one generation path contains a leak. There are additional goals and features provided as well.

Figure 1:
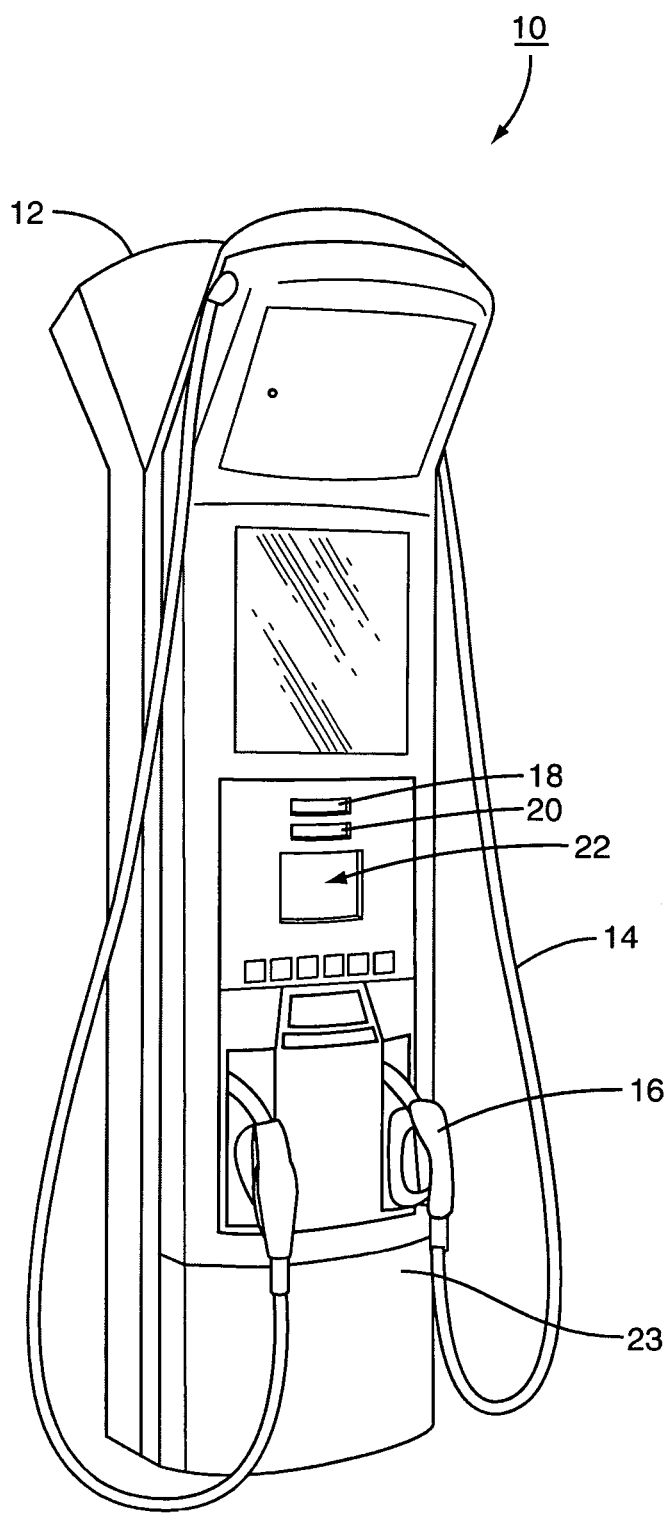
FIG. 1 is an illustration of a typical fuel dispenser in the prior art.
Figure 2:
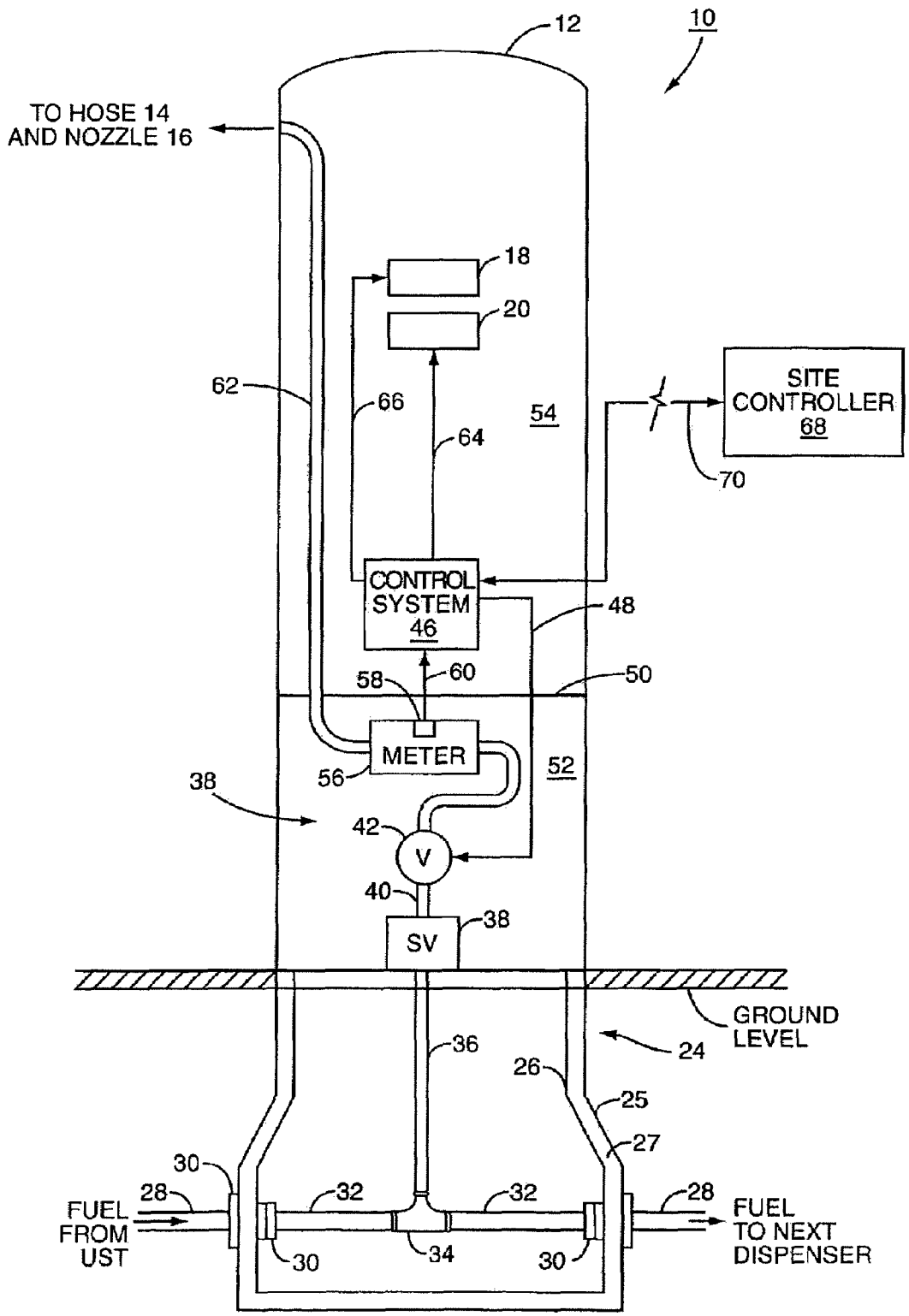
FIG. 2 is an illustration of the fuel dispenser illustrated in FIG. 1 showing the internal components of the fuel dispenser and the interface between a shear valve, a branch fuel piping, internal fuel dispenser piping, and a dispenser sump in the prior art.
Figure 3:
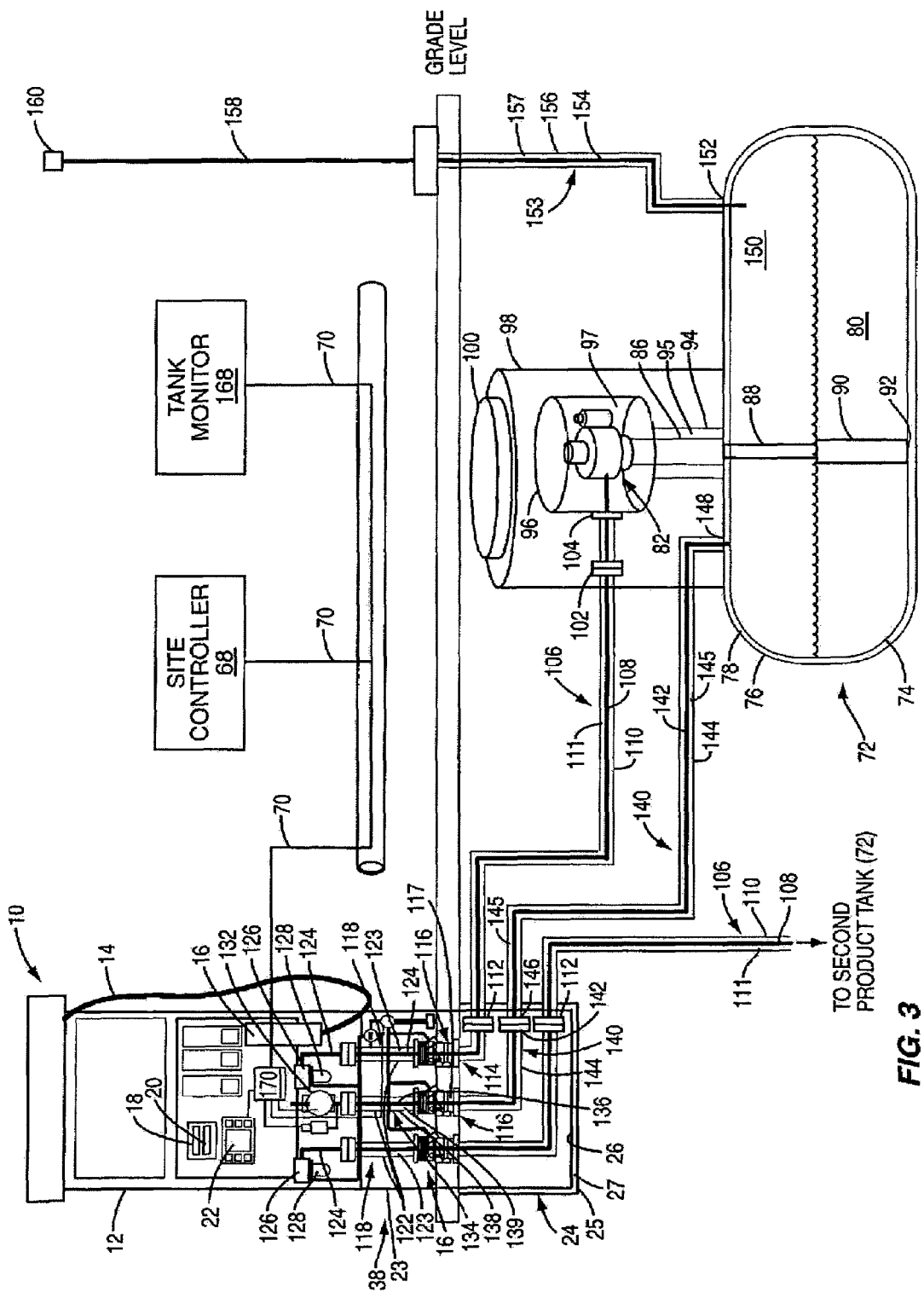
FIG. 3 is an illustration of a secondary containment system in a service stations in accordance with the present invention for capturing and monitoring leaks in fuel-handling components.

Before addressing the particular aspects and features of the present invention, a typical fuel dispenser 10 is discussed and illustrated in FIGS. 1 and 2 as background information for discussion of the present invention. FIG. 3, discussed later below, starts the discussion of the new features of the present invention.

FIG. 1 illustrates a fuel dispenser 10 that dispenses fuel to a vehicle. The fuel dispenser 10 is comprised of a housing 12. The housing 12 supports or contains the fuel dispenser 10 components needed to receive, measure, and dispense fuel to a vehicle (not shown) as is well known. A hose 14 and nozzle 16 are provided so that fuel carried internal to the fuel dispenser 10 is dispensed through the hose 14 and through the nozzle 16 into a vehicle fuel tank (not shown). The fuel dispenser 10 contains a price display 18 that displays the price to be charged to the customer for fuel dispensed, and a volume display 20 that displays the volume of fuel dispensed, typically in gallons or liters. The fuel dispenser 10 may also contain an instruction display 22 that provides information, instructions, and/or advertising to the customer interfacing with the fuel dispenser 10. Components inside the fuel dispenser 10 are contained in the housing 12 accessible through a cabinet door 23.

FIG. 2 contains an illustration of an internal view of some of the components typically contained inside the fuel dispenser 10 as well as some fuel-handling components located beneath the fuel dispenser 10, typically underneath the ground. A fuel dispenser sump 24 may be provided underneath the fuel dispenser 10 to capture any leaks that may occur in fuel piping that carries fuel to the fuel dispenser 10. If double-walled, the fuel dispenser sump 24 may be comprised of an outer sump 25 surrounding an inner sump 26, which forms an interstitial space 27 between the wall of the outer sump 25 and the inner sump 26. In this manner, if a leak occurs in the inner sump 26, the outer sump 25 will capture and contain the leak in the interstitial space 27.

The fuel is carried inside a main fuel piping 28 located underneath the ground as illustrated. The fuel is typically pumped from a submersible turbine pump (STP) located in the fuel storage tank (not shown) into the main fuel piping 28. The main fuel piping 28 typically enters into the fuel dispenser sump 24 via a sump pipe fitting 30. The main fuel piping 28 is typically a double-walled fuel piping. The main fuel piping 32 inside the fuel dispenser sump 24 is connected to the sump pipe fitting 30 inside the sump 24 to carry the fuel onward. The main fuel piping 32 located inside the dispenser sump 24 may be double-walled piping (inner wall not illustrated) as well to provide an extra measure of leak containment. The interstitial space of the main fuel piping 28 is crimped onto the fuel dispenser sump 24 with the main fuel piping 32 contained internal to the sump 24 being single-walled piping, and with the fuel dispenser sump 24 providing the secondary containment.

The fuel is delivered to the individual fuel dispensers 10 via a branch fuel piping 36 that is coupled to the main fuel piping 32 typically using a T-style fitting connection 34. As fuel is delivered to the fuel dispenser 10 via the main fuel piping 28/32 and enters into the branch fuel piping 36, the fuel enters into fuel piping 40 internal to the fuel dispenser 10 via a shear valve 38 that is coupled to the branch fuel piping 36 and the internal dispenser fuel piping 40. As is well known, the shear valve 38 is designed to close the fuel flow path between the branch fuel piping 36 and the internal dispenser fuel piping 40 in the event of an impact to the fuel dispenser 10, which will in turn cause the shear valve 38 to shear in response thereto. An example of a shear valve in the prior art is disclosed in U.S. Pat. No. 5,527,130, which is hereby incorporated herein by reference in its entirety.

After the fuel exits the outlet of the shear valve 38 and enters into the dispenser fuel piping 40, it may encounter a flow control valve 42. The flow control valve 42 is under control of a control system 46 via a flow control valve signal line 48 inside the fuel dispenser 10. In this manner, the control system 46 can control the opening and closing of the flow control valve 42 to either allow fuel to flow or not flow through a meter 56 and on to the hose 14 and nozzle 16. The control system 46 typically instructs the flow control valve 42 to open when a fueling transaction is proper and allowed to be initiated.

The flow control valve 42 is contained below a vapor barrier 50 in a hydraulics area 52 of the fuel dispenser 10 where Class 1, Division 1 components are provided for safety reasons and in an intrinsically safe manner, as described in U.S. Pat. No. 5,717,564, incorporated herein by reference in its entirety. The control system 46 is typically located in an electronics compartment 54 of the fuel dispenser 10 above the vapor barrier 50 that does not have to be provided in an intrinsically safe housing. After the fuel exits the flow control valve 42, the fuel typically encounters the meter 56, wherein the fuel flows though the meter 56, and the meter 56 measures the volume and/or flow rate of the fuel. Typically, the meter 56 contains a pulser 58 that generates a pulser signal 60 to the control system 46, indicative of the volume and/or flow rate of fuel. In this manner, the control system 46 can update the price display 18 and the volume display 20, via a price display signal line 66 and a volume display signal line 64, so that the customer is informed of the price to be paid for the fuel as well as the volume of fuel dispensed.

After the fuel exits the meter 56, the fuel is carried in additional dispenser fuel flow piping 62, which is then coupled to a hose 14 typically located in the upper housing or canopy of the fuel dispenser 10 and on to the nozzle 16. The control system 46 of the fuel dispenser 10 may be coupled to an external site controller 68 via a fuel dispenser communication network 70. The site controller 68 may be the G-Site® or Passport® point-of-sale (POS) system, both manufactured by Gilbarco Inc. for example. The site controller 68 communicates with the control system 46 to authorize and control the fuel dispenser 10 activation as well as communications for payment handing for payment media presented at the fuel dispenser 10, among other things.

Overview of Secondary Containment Monitoring and Control System

As previously discussed, the present invention is a secondary containment monitoring and control system that detects leaks and provides controls to control fuel flow to prevent additional leaks. The control involves a vacuum actuated shear valve. A vacuum-generating source generates a vacuum in a monitored space. If a loss of vacuum occurs, the vacuum actuated shear valve automatically closes to cut off fuel flow to prevent fuel from being further supplied to the leak. An exemplary secondarily contained fuel delivery monitoring and control system for the service station is described below. The various components, systems and operations to achieve the aforementioned goals are described in the context of various parts of the monitoring and control system.

FIG. 3 illustrates an overall secondary containment system for containing and monitoring leaks that occur in fuel-handling components in a service station environment in accordance with the present invention. A description of the travel path of the fuel to the fuel dispenser as it travels through the fuel-handling components is now described. As illustrated, a fuel dispenser 10 is disclosed that delivers fuel to a customer's vehicle from a storage tank 72. The storage tank 72 is typically located beneath the ground, and is also commonly referred to as an "underground storage tank" (UST). The storage tank 72 is comprised of an inner container 74 surrounded by an outer container 76. An interstitial space 78 is formed between the inner and outer containers 74, 76. In this manner, if a breach occurs to the inner container 74, fuel 80 stored inside the inner container 74 will leak and be captured inside the interstitial space 78 by the outer container 76 and prevented from leaking to the ground if no leak exists in the outer container 76.

In order to detect a leak or breach in either the inner or outer containers 74, 76, the interstitial space 78 is monitored to determine if a leak exists. A liquid solution, such as brine for example, may also be placed in the interstitial space 78 to be used for leak detection. Alternatively, the interstitial space 78 may be placed under a vacuum or pressure by a vacuum-generating source, as the system disclosed in the '534 patent, previously referenced. The vacuum-generating source may be provided from a siphon port (not shown) on a submersible turbine pump 82 as illustrated in FIG. 3 disclosed in the '534 patent, or from a separate vacuum-generating source 372 and pressure sensor 370 combination provided separately and externally form the submersible turbine pump 82. In the system of the '534 patent, the system monitors pressure variations in the interstitial space 78 in order to detects leaks that occur in both the inner and outer containers 74, 76 of the storage tank 72. In this manner, if a leak occurs in the outer container 76, the system serves as a leak prevention system, since a leak of fuel 80 to the environment will not actually occur unless there is a leak in the inner container 74 as well.

In order to draw fuel 80 out of the storage tank 72 for delivery to the fuel dispensers 10, the submersible turbine pump 82 is typically provided. The submersible turbine pump 82 is comprise of a head (not labeled) containing power and control electronics (not shown) that provide power through a riser pipe 86 down to a boom 88 inside the storage tank 72 eventually reaching a turbine pump (not shown) contained inside an outer turbine pump housing 90. As power is applied by the electronics to cause the turbine rotor to rotate, a pressure differential is caused between the turbine motor housing (not shown) and the outer housing 90 to draw fuel 80 upward from the storage tank 72 into the boom 88 and riser pipe 86 for delivery to the fuel dispensers 10. The submersible turbine pump 82 may contain a siphon (not shown) that allows the submersible turbine pump 82 to generate a vacuum using the force of fuel 80 to flow as described in the '534 patent. More information on a submersible turbine pump providing a siphon may be found in U.S. Pat. No. 6,622,757, incorporated herein by reference in its entirety.

The riser pipe 86 may be secondarily contained with a surrounding outer piping 94, as illustrated in FIG. 3, to provide containment of leaks that may occur in the riser pipe 86. An interstitial space 95 is formed by the space between the riser pipe 86 and the surrounding outer piping 94. In this manner, much like the storage tank outer container 76 and interstitial space 78, the interstitial space 95 can be monitored for leaks. One method of monitoring for leaks is by generating a vacuum in the interstitial space 95 using a vacuum-generating source, like that described in U.S. Pat. No. 6,997,042 (the "'042 patent"), previously referenced. By generating a vacuum level in the interstitial space 95 and monitoring pressure in the interstitial space 95, a breach of either the riser pipe 86 or the surrounding outer piping 94 may be detected since a pressure variation will occur if either is breached. The vacuum-generating source may be provided from the siphon port (not shown) on the submersible turbine pump 82, or from a separate source.

It may also be desirable to secondarily contain the submersible turbine pump head (not labeled) to capture and monitor leaks that may occur from the head (not labeled). U.S. Pat. No. 7,010,961 (the "'961 patent"), previously referenced, discloses such a system. The head (not labeled) is placed inside and surrounded by an enclosure or head container 96. An interstitial space 97 is formed between the head (not labeled) and the head container 96. The head container 96 must contain an orifice that is sealed, but adapted to receive the riser pipe 86 and its surrounding outer piping 94 as well as a main fuel piping 106. If a leak occurs in the submersible turbine pump head (not labeled), the leak will be captured inside and at the bottom of the head container 96. If monitoring of leaks is desired, a vacuum-generating source is provided to generate a vacuum or pressure in the interstitial space 97. Pressure variations are then monitored to determine if there is a breach in the head (not labeled) or the head container 96.

The submersible turbine pump 82 and head container 96, if provided, are typically placed inside a submersible turbine pump sump 98. The STP sump 98 serves as a holding container for the submersible turbine pump 82 under the ground and to mount the submersible turbine pump 82 on top of the fuel storage tank 72. The STP sump 98 contains an access port 100 so that service personnel can reach and gain access to the submersible turbine pump 82 for repairs or maintenance.

Although FIG. 3 illustrates one fuel storage tank 72 and submersible turbine pump 82 combination, it is understood that each grade of fuel provided at the service station will be contained in additional fuel storage tanks 72 and pumped out using submersible turbine pump 82 combinations. Further, two or more submersible turbine pumps 82 may be siphoned together as disclosed in U.S. Pat. No. 5,544,518, incorporated herein by reference in its entirety.

After the fuel 80 is drawn by the submersible turbine pump 82 into the head (not labeled), the fuel is carried through the head container 96 through orifice 104 and through the STP sump 98 through orifice 102 to a main fuel piping 106 that carries fuel 80 to the fuel dispensers 10 for eventual delivery. The main fuel piping 106 is a double-walled piping comprised of a main inner piping 108 that carries the fuel 80, surrounded by a main outer fuel piping 110 that provides secondary containment of a main inner fuel piping 108. The secondary containment is provided since the main fuel piping 106 is a fuel-handling component. A main fuel piping interstitial space 111 is formed between the main inner fuel piping 108 and the main outer fuel piping 110. Any fuel 80 that leaks from the main inner fuel piping 108 will be captured by the main outer fuel piping 110 and rest inside the main fuel piping interstitial space 111 if the main outer fuel piping 110 does not contain a leak. Thus, the main fuel piping interstitial space 111 is monitored to detect leaks in both the main inner and outer fuel pipings 108, 110. A vacuum-generating source, such as the submersible turbine pump 82 using its siphon (not shown), or standalone vacuum-generating source may be used to generate a vacuum or pressure in the main fuel piping interstitial space 111. Pressure variations in the main fuel piping interstitial space 111 are monitored to detect a breach in either the main inner fuel piping 108 or the main outer fuel piping 110. Such as system is disclosed in U.S. Patent Application Publication Nos. US 2004/0045343 A1; US 2005/0039518 A1; US 2005/0145016 A1; and US 2005/024711 A1, previously referenced.

The fuel 80 is carried inside the main inner fuel piping 108 and through the below ground fuel dispenser sump 24 via a sump orifice 112 until it reaches branch fuel piping 114. The branch fuel piping 114 is fuel piping dedicated to an individual fuel dispenser 10 that is coupled to the main fuel piping 106 to tap into the main fuel supply 80 carried by the main fuel piping 106. The branch fuel piping 114 is a double-walled fuel piping comprised of an inner and outer piping similar to that of the main fuel piping 106 such that the branch fuel piping 114 is secondarily contained for capture and monitor of leaks as described above. A branch fuel piping 114 is provided for each grade of fuel delivered by the fuel dispenser 10. In the example illustrated in FIG. 3, the fuel dispenser 10 is a blending fuel dispenser. Only the high and low grades of gasoline are supplied to the fuel dispenser 10. The fuel dispenser 10 blends the two grades of gasoline to provide intermediate grades of fuel.

The branch fuel piping 114 carries the two grades of fuel into independent product line shear valves 116, typically provided at the base of the fuel dispenser 10. The product line shear valves 116 contains an internal flow path to carry the fuel 80 from the branch fuel piping 114 to internal dispenser fuel piping 118 on its way to being dispensed through the hose 14 and nozzle 16. The product line shear valves 116 are designed to shear and close off the fuel flow path of the internal fuel dispenser piping 118 in the event of an impact to the fuel dispenser 10. The shear valve 116 typically contains one or more poppet valves (not shown) that are designed to close when a shear occurs as is described in U.S. Pat. No. 5,527,130, previously referenced.

In the present invention, the product line shear valves 116 are double-walled shear valves that provide secondary containment. The product line shear valve 116 contains an internal fuel flow path formed by an inner housing (not shown), surrounded by an outer housing, thereby forming an interstitial space (not shown) there between. In this manner, a fuel leak that occurs in the inner housing is captured and contained in the outer housing similar to the other aforementioned secondarily contained fuel-handling components. An example of a double-walled shear valve 116 that may be used with the present invention is described in the '390, '394, and '886 applications, previously referenced.

The product line shear valves 116 are designed for their interstitial space to couple to the interstitial space of the branch fuel piping 114 when the two are coupled together so that both spaces can be drawn under a vacuum and monitored as one space or "zone." Further, the internal dispenser fuel piping 118 may be a double-walled fuel piping comprised of an inner dispenser fuel piping (not labeled) surrounded by an outer dispenser fuel piping 122. A dispenser fuel piping interstitial space 123 is formed between the inner dispenser fuel piping (not labeled) and the outer dispenser fuel piping 122. The interstitial space of the shear valve 116 and/or the branch fuel piping 114 may be fluidly coupled to a dispenser fuel piping interstitial space 123 so that all three interstitial spaces may be monitored as one zone and so that leaks from all three fuel-handling components are collected together. If the main fuel piping interstitial space 111 is fluidly coupled to the branch fuel piping interstitial space, leaks that are captured in either the internal fuel dispenser piping 118, the product line shear valve 116, and/or the branch fuel piping 114 may be captured and returned to the storage tank 72 via the main fuel piping interstitial space 111 if coupled to the storage tank 72. Further, leaks captured by the head container 96 and the surrounding outer piping 94 of the riser pipe 86 may be returned to the storage tank 74 as well. Such a system is described in the '157 application and the '161, '269, and '054 patents, previously referenced. In this manner, separate evacuation of the interstitial spaces may not be necessary to save service costs.

After the fuel 80 travels into the fuel dispenser piping interstitial space 123, the fuel eventually reaches a portion of internal fuel dispenser piping 124 coupled to the double-walled internal dispenser fuel piping 118 that is not secondarily contained (i.e. does not contain an outer piping). The internal fuel dispenser piping 124 may be contained above the fuel dispenser sump 360 (illustrated in FIG. 11) such that leaks from the internal fuel dispenser piping 124 are captured by the dispenser sump 360 thereby alleviating the need for the internal fuel dispenser piping 124 to need secondary containment. The fuel 80 then travels through a fuel filter coupling 126 coupled inline to the dispenser piping 124 and through a fuel filter 128 attached to a fuel filter coupling 126. In this manner, the fuel 80 will travel through the fuel filter 128 to filter out contaminants before reaching the hose 14 and nozzle 16. An example of a fuel filter coupling 126 and fuel filter 128 combination is disclosed in U.S. Pat. No. 5,013,434, incorporated herein by reference in its entirety.

After the fuel 80 leaves the fuel filter 128, the individual internal fuel dispenser pipings 124 are manifolded together for either the high, low, or blended grade of fuel 80 to be dispensed through a single hose 14. The fuel dispenser 10 illustrated in FIG. 3 is a single hose dispenser 10, but could also be a multi-hose dispenser 10 as well. The fuel dispenser 10 illustrated in FIG. 3 is also a vapor-recovery equipped dispenser that recovers vapors through the nozzle 16 and hose 14 to return to the storage tank 72. An example of a vapor-recovery assist equipped fuel dispenser is disclosed in U.S. Pat. No. 5,042,577, incorporated herein by reference in its entirety. The fuel dispenser 10 contains internal vapor return piping (not shown) coupled to a vapor flow meter 132 that measures vapor collected by the nozzle 16 when fuel 80 is dispensed. The vapor flow meter 132 may be used for in-station diagnostics (ISD) and monitoring or control of vapor recovery, as disclosed in U.S. Pat. No. 6,622,757, incorporated herein by reference in its entirety.

After the recovered vapor passes through the vapor flow meter 132, the vapor then passes through an internal vapor return piping 134 internal to the fuel dispenser 10 on the outlet side of a vapor line shear valve 117 on its way to being sent back to the storage tank 72. The internal vapor return piping 134 is comprised of an internal inner vapor return piping 136 surrounded by an internal outer vapor return piping 138. An interstitial space 139 is formed between the internal inner and internal outer vapor return piping 136, 138. In this manner, secondary containment is provided for the internal vapor return piping 134 as well in case the internal inner vapor return piping 136 contains a leak. Because the vapor line shear valve 117 is also a double-walled shear valve, the internal vapor piping interstitial space 139 is coupled to an interstitial space (not shown) of the vapor line shear valve 117 and is returned to vapor return piping 140 located on the inlet side of the vapor line shear valve 117, typically inside the fuel dispenser sump 24. The vapor return piping 140 is comprised of an inner vapor return piping 142 surrounded by an outer vapor return piping 144. A vapor return piping interstitial space 145 is formed between the inner and outer vapor return piping 142, 144. The vapor return piping 140 is coupled to the storage tank 72 via coupling 148. More specifically, the inner vapor return piping 142 is fluidly coupled to the ullage 150 of the storage tank 72 where vapors reside. In this manner, the recovered vapor is recombined with the vapor in the ullage 150 to prevent vapor emissions escaping to atmosphere. The vapors recombine and liquefy into fuel 80.

If the pressure in the storage tank 72 becomes too high or too low, a vent allows the vapor/air mixture in the ullage 150 to either be vented to atmosphere or air to be drawn into the ullage 150 to stabilize the pressure. A vent coupling 152 is provided that is fluidly coupled to the ullage 150 of the storage tank 72. The vent coupling 152 is attached to a vent pipe 153, which may be comprised of an inner vent piping 154 surrounded by an outer vent piping 156. In this manner, any leak in the inner vent piping 154 contains the vapors in the ullage 150 in a vent piping interstitial space 157 formed between the inner and outer vent piping 154, 156.

As the vapor from the ullage 150 travels through the inner vent piping 154, the vapor will travel through an above ground vent piping 158 that is coupled to a pressure-relief (P/V) valve 160. The P/V valve 160 is designed to open when extreme pressure conditions occur in the ullage 150 so that air is either ingested or vapor in the ullage 150 exhausted to atmosphere to prevent the pressure in the ullage 150 from stabilizing at extreme pressure ranges.

Several control systems are provided in the service station illustrated in FIG. 3. The site controller 68 and a tank monitor 168 are coupled to the fuel dispenser communication network 70. The tank monitor 168 provides tank reconciliation by receiving information about metered fuel 80 dispensed from the fuel dispensers 10 or site controller 68 and from tank level probes (not shown) in the storage tank 72. The fuel dispenser 10 of the present invention contains a dispenser sensor module (DSM) 170 that communicates with and controls certain aspects of secondary containment monitoring and control according to the present invention. The DSM 170 will be described in more detail below in this application starting with FIG. 11. The DSM 170 is communicatively coupled to the fuel dispenser communication network 70 to communicate with the tank monitor 168 as will be later described as well.

Overview of Monitoring and Control Components

Now that the overall system and fuel-handling components for fuel 80 transport from the storage tank 72 to the fuel dispensers and secondary containment has been described, novel fuel handing, monitoring, and control components of the present invention will now be described.

FIGS. 4-12 described below set forth various components and features of the secondary containment monitoring and control system. FIGS. 13-20 describe an embodiment of the present invention employing the components and features described in FIGS. 4-12.

Vacuum-Actuated Shear Valve

One stated goal of the present invention is to provide automatic control and closing of the product line shear valves 116 in the event that a leak is detected. In this manner, fuel 80 is not continuously supplied to the leak source if the leak exists in a fuel-handling component located in the fuel flow path on the output of the product line shear valve 116. In order to accomplish this goal, the present invention provides for the product line shear valves 116 to be "vacuum actuated." A vacuum-actuated shear valve is shear valve that automatically closes its internal fuel flow path when there is a sufficient loss of vacuum because a leak is detected due to a loss of vacuum as a result of drawing a vacuum in the interstitial space of fuel-handling components. In the present invention, providing a vacuum-actuated shear valve that is coupled to the interstitial space provides a convenient way to automatically close the product line shear valve in response to a leak (i.e. loss of vacuum).

Figure 4:
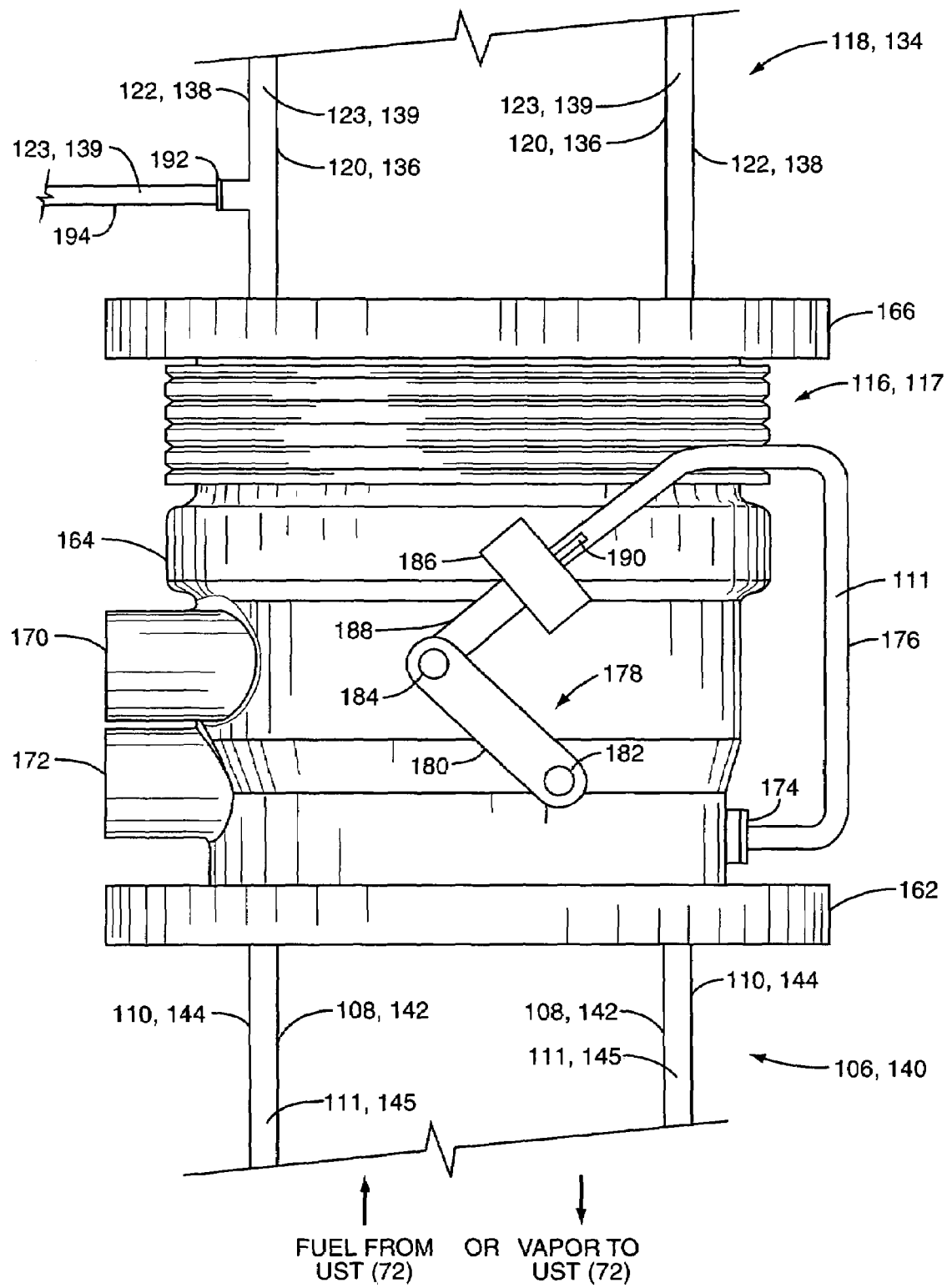
FIG. 4 is an illustration of a vacuum actuated shear valve in accordance with one vacuum actuated shear valve embodiment of the present invention.

FIG. 4 illustrates one embodiment of a vacuum-actuated product line shear valve 116 in accordance with the present invention that is designed to close the fuel flow path internal to the product line shear valve 116 in response to a loss of vacuum. The loss of vacuum may be caused by a leak. The product line shear valve 116 illustrated in FIG. 4 is a double-walled shear valve like those described in the '390, '394, and '886 applications, previously referenced. As previously discussed above, an interstitial space of fuel-handling components may be drawn under a vacuum level, wherein a vacuum monitoring system monitors the vacuum level of the interstitial space to detect a breach or leak, like the systems described in the '343, '518, '016, and '111 applications, and the '534, '042, '961, '660, and '661 patents, previously referenced.

Note that although the shear valve illustrated in FIG. 4 can be used as either a product line shear valve 116 or a vapor line shear valve 117, only the product line shear valve 116 contains the vacuum actuator in the disclosed embodiment. This is because it is only desired to close the product line shear valve 116 in response to a leak. The vapor line shear valve 117 does not close, because the vapor return piping 140 is a common piping for all internal fuel dispenser piping product lines 118 within the fuel dispenser 10 to return vapors of FIG. 3. If a leak were to exist in a particular product main fuel piping 106 or internal fuel dispenser piping 118, 124 such that a product line shear valve 116 is closed as a result, thus shutting down delivery of that product line, the vapor return piping 140 cannot be closed since it services other products fuel pipings 106. However, the vapor line shear valve 117 could be designed to actuate and close automatically in response to a leak (i.e. loss of vacuum) just like the product line shear valve 116 if desired. The product line shear valve 116 and the vapor line shear valve 117 can be comprised of the same construction and components so that both shear valves 116, 117 are double-walled to provide secondary containment of leaks.

The product line shear valve 116 illustrated in FIG. 4 is a double-walled shear valve like those described in the '390, '394, and '886 applications, previously referenced. The discussion below is applicable to both the product line shear valve 116, or the vapor line shear valve 117, although only the product line shear valve 116 contains the vacuum actuator. As illustrated in FIG. 4, the shear valves 116, 117 accept the double-walled piping 106, 140 that is comprised of the outer piping 110, 144 surrounding the inner piping 108, 142 with the interstitial space 111, 145 formed therebetween, as previously described in FIG. 3. Fuel or vapor flows in the inner piping 108, 142 into the shear valves 116, 117. As discussed in the '390, '394, and '886 applications, the double-walled piping 106, 140 is coupled to an upstream housing 162 that is attached to a containment housing 164 and a downstream housing 166. The upstream, containment, and downstream housings 162, 164, 166 fit together to provide an internal fuel flow path as well as a containment housing forming an interstitial space therebetween as disclosed in the '390, '394, and '886 applications. Providing a double-walled shear valve 116, 117 allows the interstitial space 111, 145 of the piping 106, 140 and the shear valve 116, 117 to be coupled together on the upstream side of the shear valve 116, 117 and monitored for leaks as one space or zone using a single vacuum-generating source to generate a vacuum level in the interstitial space 111, 145, as discussed in the '504 application, previously referenced.

On the downstream side of the shear valve 116, 117, an internal fuel dispenser piping 118, 134 that either carries fuel or vapor is coupled to the downstream housing 166 of the shear valve 116, 117 to carry the fuel 80 or vapor to and from the hose 14 and nozzle 16 of the fuel dispenser 10. In the illustrated embodiment, the internal dispenser piping 118, 134 is doubled-walled piping comprised of the inner piping 120, 136 surrounded by the outer piping 122, 138 as previously described, wherein the interstitial space 123, 139 is coupled to the interstitial space of the shear valve 116, 117 (not shown), which is coupled in turn to the branch piping interstitial spaces 111, 145. All of these interstitial spaces are coupled together for leak monitoring as described in '504 application, previously referenced.

The shear valve 116, 117 is illustrated as having a latch 178 having an arm 180 secured through the housing of the shear valve 116, 117 to a main poppet valve (not shown) contained internal to the shear valve 116, 1117 as described in the '390, '394, and '886 applications, previously referenced. The arm 180 is spring biased downward, but is held upward by its connection to a fusible link 188 via connection 184. If the fusible link 188 is released, the energy stored in the spring (not shown) is released causing the arm 180 to move downward, thereby closing the main poppet valve contained internal to the shear valve 116, 117. This closes off the flow path inside the shear valve 116, 117 to prevent fuel flow. The fusible link 188 is designed to fail, thereby allowing the arm 180 to move downward and close the flow path inside the shear valve 116, 117 if an extreme temperature surrounds the fusible link 188, such as due to a fire.

The fusible link 188 is also connected to a vacuum-actuated solenoid 186 in the case of the product line shear valve 116. The vacuum-actuated solenoid 186 in its deactivated state applies a pulling force on the fusible link 188 to thereby apply a pulling force on the arm 180 to keep the flow path internal to the product line shear valve 116 open. The vacuum actuated solenoid 186 is coupled to a vacuum conduit or tubing 176 via a fitting 190, which is in turn connected to an interstitial space fitting 174 on the external body of the product line shear valve 116. The interstitial space fitting 174 couples the vacuum conduit 176 to the interstitial space internal to the product line shear valve 116. As illustrated in FIG. 4, the branch piping interstitial space 111, the interstitial space of the product line shear valve 116, and the internal fuel dispenser piping interstitial space 123 are all fluidly coupled together. Thus, coupling the vacuum conduit 176 to the interstitial space fitting 174 couples the vacuum conduit 176 and vacuum actuator 186 to interstitial spaces 111, 123 for monitoring leaks.

If a leak occurs in any of the interstitial spaces 111, 145, 123, 139, such that a change in pressure or vacuum level were to occur like described in the vacuum monitoring system of the '504 application, this loss of vacuum causes the vacuum actuated solenoid 186 to release the fusible link 188, which would in turn cause the arm 180 to move downward and close the main poppet valve of the product line shear valve 116. This causes the flow path internal to the product line shear valve 116 to be closed, thereby cutting off the source of fuel 80 or vapor from continuing to be delivered to the leak. The vacuum monitoring system can then generate an appropriate alarm or signal to alert service personnel of the leak.

The internal fuel dispenser piping 118, 134 illustrated in FIG. 4 also contains an interstitial space port 192 that allows the interstitial space 123, 139 to be coupled via tubing 194 to another system. This allows the interstitial space 123, 139 to be coupled to another interstitial space containing another fuel-handling component to allow such component to be monitored in the same zone. A loss of vacuum generated as a result of a leak in this other interstitial space can then also control the vacuum actuated solenoid 186 to close the flow path of the product line shear valve 116 in the event of a leak.

Figure 5:
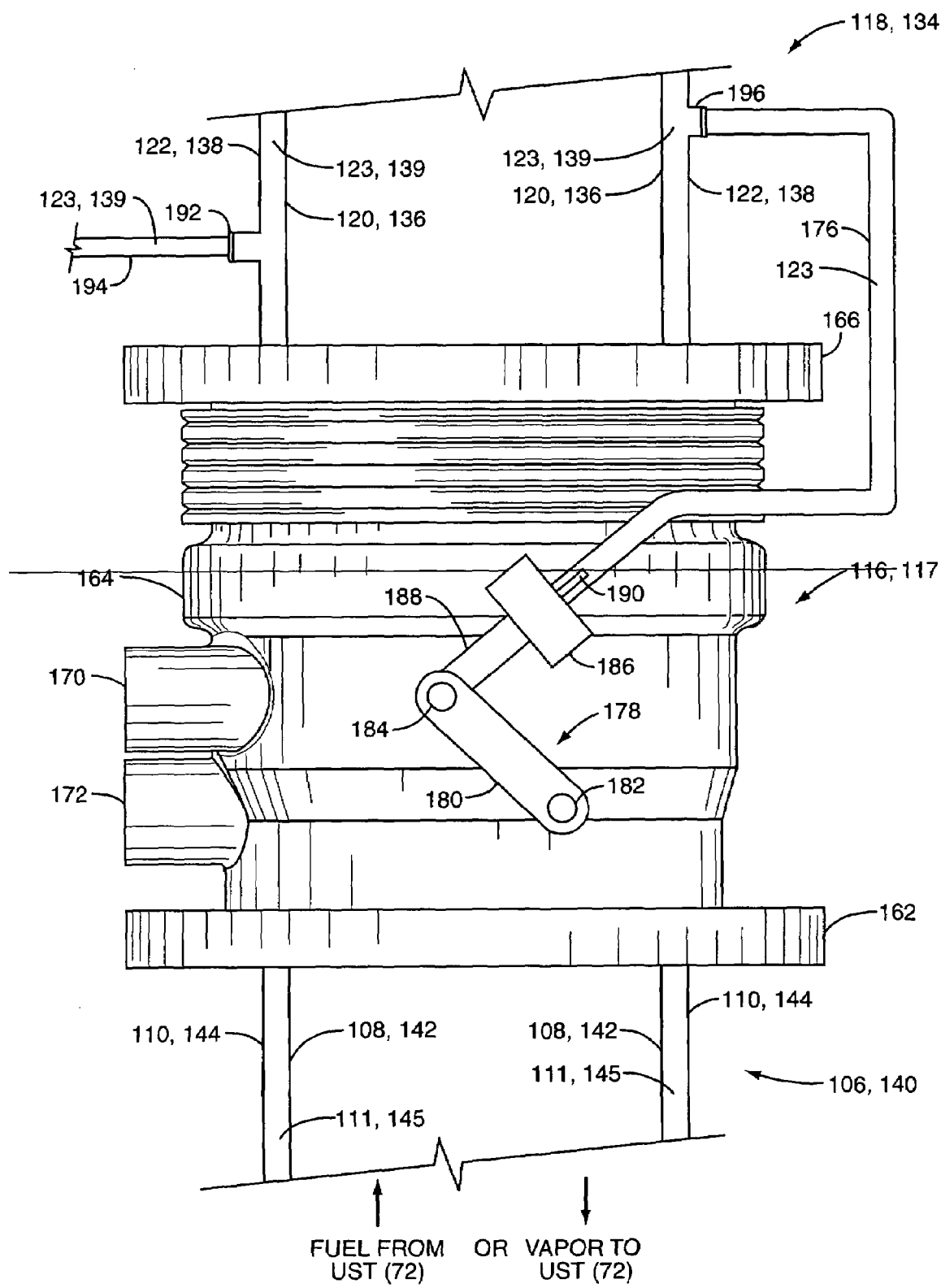
FIG. 5 is an illustration of a vacuum actuated shear valve in accordance with another vacuum actuated shear valve embodiment of the present invention.

FIG. 5 illustrates the product line shear valve 116 in accordance with another embodiment of the present invention similar to the embodiment in FIG. 4. Instead of the vacuum actuated solenoid 186, via the vacuum tubing 176, being coupled to an interstitial space fitting 174 on the product line shear valve 116, the vacuum conduit 176 is coupled to an interstitial space fitting 196 on the internal fuel dispenser piping 118, 134. This may be advantageous over providing the interstitial space fitting as part of the product line shear valve 116 for various reasons, or if the interstitial space 123, 139 of the internal fuel dispenser piping 118, 134 is not coupled to the interstitial space of the shear valves 116, 117 and/or the branch piping 111, 145. If a separate vacuum-generating source is used to draw a vacuum in the interstitial space 123, 139 of the internal dispenser piping 118, 134 separate from the interstitial space of the shear valve 116 and/or branch piping interstitial spaces 111, 145, and it is desired for the product line shear valve 116 to close due to a loss of vacuum in the internal fuel dispenser piping 118, 134, it is necessary to couple the vacuum actuated solenoid 186 directly to the internal dispenser piping interstitial spaces 123, 139.

Figure 6:
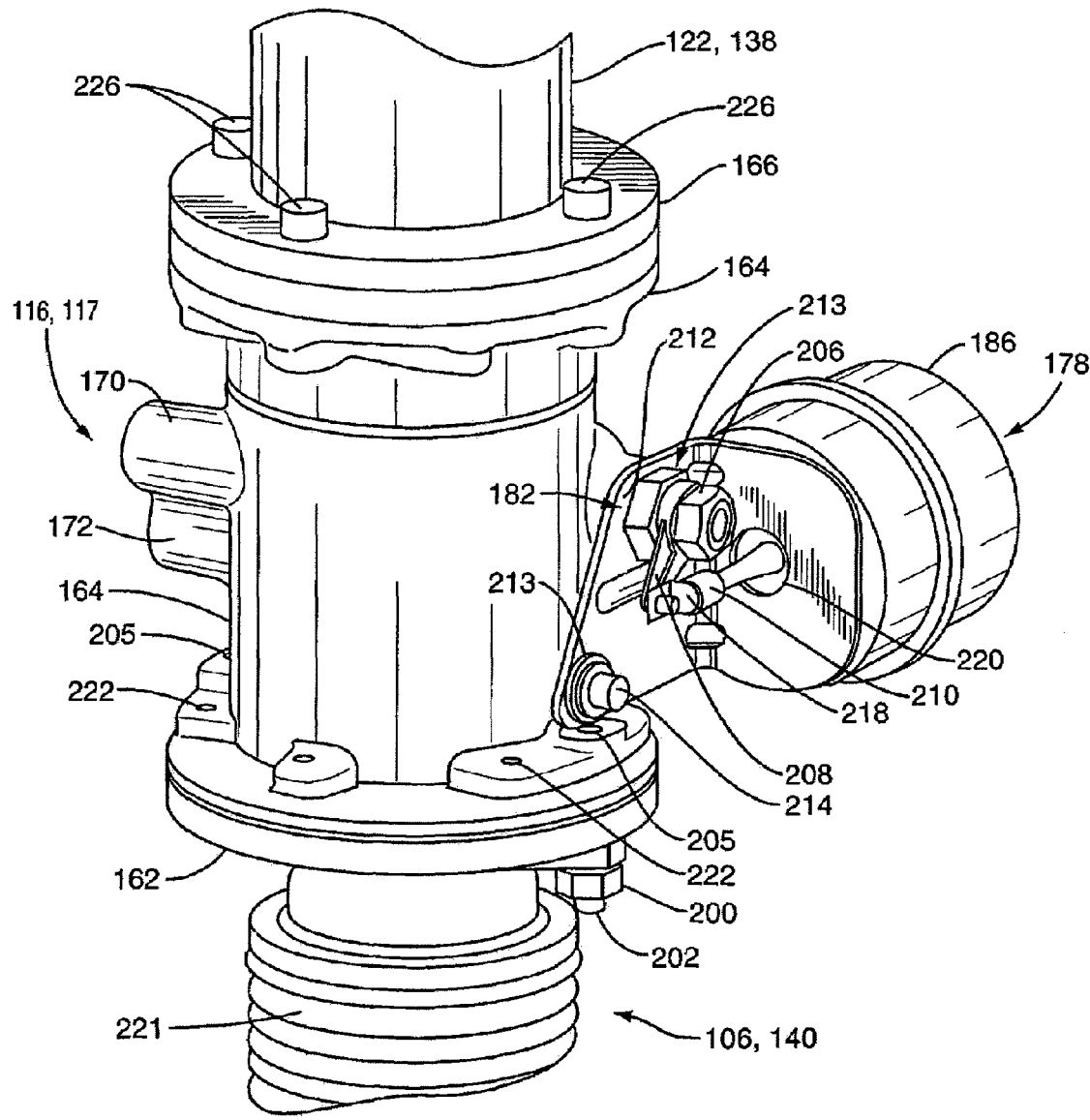
FIG. 6 is an illustration of a vacuum actuated shear valve in accordance with a third vacuum actuated shear valve embodiment of the present invention.
Figure 12:
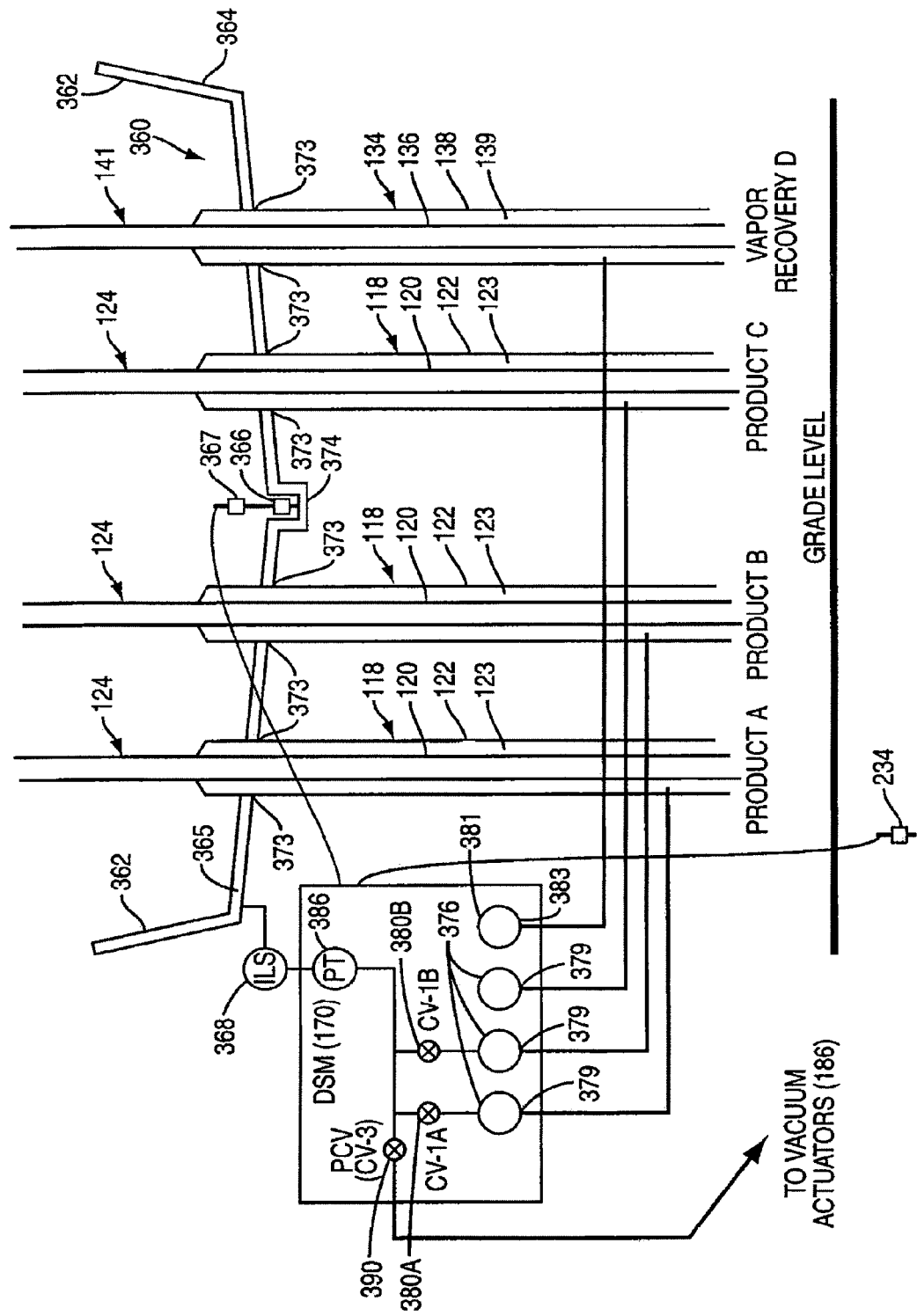
FIG. 12 is an illustration of a secondarily contained fuel dispenser with containment sump in accordance with the system of FIG. 3 with operational interfaces for capturing and monitoring a leak.

FIG. 6 illustrates a third embodiment of a double-walled shear valve 116, 117 that is disclosed in the '394 and '886 applications, previously referenced. The shear valve 116, 117 may be used for either the product line internal fuel dispenser piping 118 or the internal vapor return piping 186. But, for the product line version of the product line shear valve 116, it is fitted with the vacuum actuator 186. The vacuum actuator 186 is coupled to the interstitial space of the shear valve 116 as illustrated in FIG. 12 of the '394 and '886 applications. The vacuum actuator 186 is designed to apply a rotational force to a rotatable shaft 182 to open and close a main poppet valve (not shown) inside the product line shear valve 116 that controls the opening and closing of the flow path in response to generation or loss of a vacuum level in the interstitial space. As discussed previously, the interstitial space of the shear valve 116 may be coupled to the interstitial space of the internal fuel dispenser piping interstitial space 123, or the branch fuel piping interstitial space 111. In this manner, a loss of vacuum in either of these two interstitial spaces will cause the vacuum actuator 186 to close the main poppet valve of the product line shear valve 116, thereby closing the flow path.

The vacuum actuator 186 is comprised of an internal vacuum actuation device (not shown) that retracts a vacuum actuator shaft 210 from a vacuum actuator orifice 220 in response to generation of a sufficient vacuum level. The vacuum actuator 186 is attached to the containment housing 164 of the product line shear valve 116 via a vacuum actuator mounting plate 212. The vacuum actuator mounting plate 212 contains two mounting orifices 213. A mounting bolt 214 is placed inside one mounting orifice 213 to secure the plate 212 to the containment housing 164. The rotatable shaft 182 that protrudes from the containment housing 164 fits inside the other orifice 213 and is secured using another bolt 206.

The vacuum actuator shaft 210 is coupled to an attachment means 218 that is attached by a shaft 216 to a lever 208 attached to the rotatable shaft 182. The rotatable shaft 182 is spring biased in a clockwise rotational direction. When a sufficient vacuum level is generated, the vacuum actuator 186 pulls the vacuum actuator shaft 210 inward, thereby causing the rotatable shaft 182 to rotate counter-clockwise. This opens the main poppet valve inside the flow path within the product line shear valve 116 to allow fuel 80 to flow. When the vacuum level is sufficiently lost in the interstitial space coupled to the vacuum actuator 186, the vacuum actuator 186 moves the vacuum actuator shaft 210 outward thereby releasing the energy in the spring biased rotatable shaft 182, causing it to rotate clockwise. This closes the main poppet valve inside the flow path of the product line shear valve 116, thereby cutting off fuel flow. This is because a loss of vacuum level in the interstitial space coupled to the vacuum actuator 186 is indicative of a leak or other condition where it is desired to close the product line shear valve 116.

The shear valve 116, 117 may be used as both a product line or vapor line shear valve, but only the product line shear valve 116 contains the vacuum actuator 186 in the preferred embodiment. The double-walled shear valve 116, 117 illustrated in FIG. 6 is attached to the branch piping 106, 140 as well as the internal dispenser piping 122, 138. The branch piping 106, 140 may include a flex connection piping portion 221 to allow flexibility when attaching the branch piping 106, 140 to the double-walled shear valve 116, 117 in the field. Vapor and fuel flow from the storage tank 72 travels through internal dispenser piping 122, 138 and the double-walled shear valve 116, 117 when the main poppet valve inside the shear valve 116, 117 is opened. The internal dispenser piping 122, 138 are attached to the upstream housing 162 of the double-walled shear valve 116, 117 via fasteners 222. The branch fuel piping 106, 140 is attached to the upstream housing 162 of the shear valve 116, 117 via fasteners 200 that are fitted into orifices 205 and secured tightly via bolts 202.

Shear Valve Actuation

Figure 7:
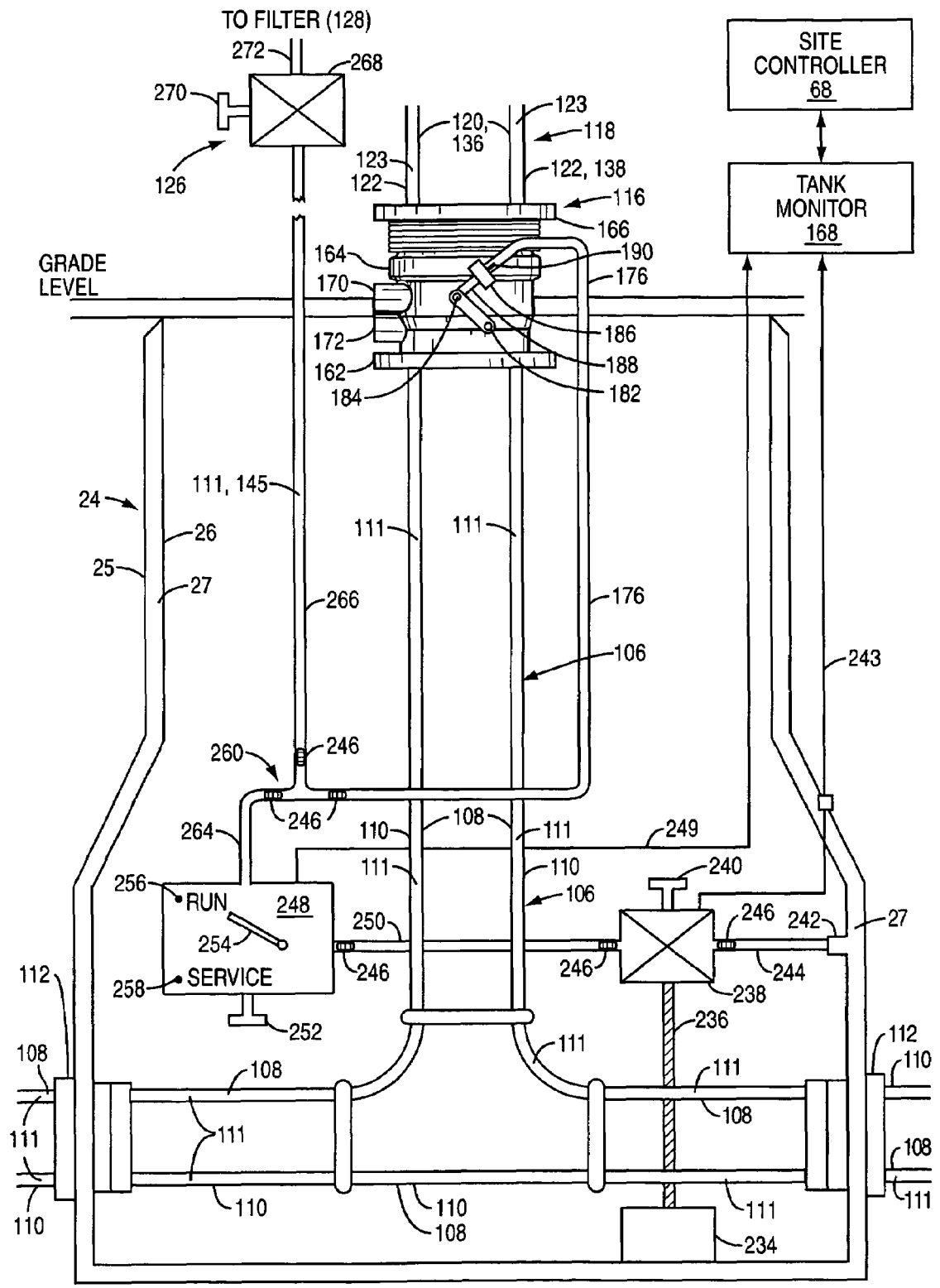
FIG. 7 is an illustration of a vacuum actuated shear valve system employing a flow switch, service switch, and filter interlock to control the vacuum actuated shear valve in accordance with one embodiment of the present invention.

At this point, a product line shear valve 116 has been discussed that is designed to close due to a loss of vacuum in a space coupled to the vacuum conduit 176. FIG. 7 illustrates a system and method of automatically closing the flow path of the product line shear valve 116 in response to other conditions as well where automatic closing of the product line shear valve 116 is desired. These other conditions include detection of a leak collected at the bottom of the fuel dispenser sump 24, selecting a service setting, and/or the closing of a filter interlock to change the filter 128 in the fuel dispenser 10 in order to provide an automatic safety mechanism when changing the filter 128.

As illustrated in FIG. 7, the double-walled product line shear valve 116 is shown as receiving the branch piping 106, 140 that runs into and inside the fuel dispenser sump 24 as illustrated previously in FIG. 3. The product line shear valve 116 contains the vacuum controlled solenoid 186, like that illustrated in FIGS. 4-6, such that the product line shear valve 116 will close in response to a loss of vacuum in the vacuum conduit 176 coupled to an interstitial space drawn under a vacuum, as previously described. The product line shear valve 116 is typically mounted to a mounting rod (not shown) located above the fuel dispenser sump 24, wherein the mounting rod is connected to the mounting bosses 170, 172 of the product line shear valve 116. The mounting rod is typically located at the top of the fuel dispenser sump 24 or in close proximity.

Dispenser Sump Leak Detector/Float Switch

Another aspect of the present invention is to provide a system and method wherein the product line shear valve 116 automatically closes its flow path in response to a leak in the fuel dispenser sump 24 in addition to the internal fuel dispenser piping 118. This is because a leak detected in the fuel dispenser sump 24 is a result of a leak of a fuel-handling component. In order to provide this feature, the dispenser sump 24 is designed to trigger a loss of vacuum at the vacuum actuated solenoid 186 of the product line shear valve 116 as follows.

As illustrated in FIG. 7, a float 234 is provided in the bottom of the fuel dispenser sump 24 to detect leaks. Any leaks that occur in the main fuel piping 106 will collect at the bottom of the fuel dispenser sump 24 due to gravity. As the volume of the leak increases in the bottom of the fuel dispenser sump 24, the leak will cause the float 234 to rise. As the float 234 rises, the float 234 will push upward on a shaft 236 that is coupled to the float 234 and is also coupled to a float valve 238 that acts as a switch. The float valve 238 is coupled to the interstitial space that is coupled to the vacuum conduit 176 via a conduit 250 via connector 246, described in more detail below. As the shaft 236 is raised by the float 234 as the result of a captured leak, the shaft 236 will cause the float valve 238 to open a vent 240 to atmosphere thereby allowing air into the conduit 250 coupled to the float valve 238 and introducing a loss in vacuum in the conduit 250 and eventually the vacuum conduit 176. Because the vacuum conduit 176 is coupled to the vacuum actuator 186, the loss of vacuum will automatically cause the product line shear valve 116 to close.

Optionally, the conduit 250 may also be coupled to an interstitial space 27 of the fuel dispenser sump 24 via an interstitial space fitting 242 and conduit 244. A vacuum-generating source (not shown) that generates a vacuum in the interstitial space 27 of the fuel dispenser sump 24 creates a vacuum in the conduit 244, that is coupled to the conduit 250 via float valve 238, and eventually the vacuum conduit 176 connected to the vacuum actuator 186. Note that although the shear valve 116 illustrated in FIG. 7 resembles the shear valve embodiments of FIGS. 4-5, shear valve 116, 117 illustrated in FIG. 6 may also be employed with its vacuum actuator 186. Note that the vacuum conduit 176 can be connected to other interstitial spaces, including those illustrated in FIGS. 4-6. In this manner, a loss of vacuum due to a leak in the fuel dispenser sump interstitial space 27 will also cause a loss of vacuum to trigger the closing of the shear valve 116, 117 as well.

Figure 8:
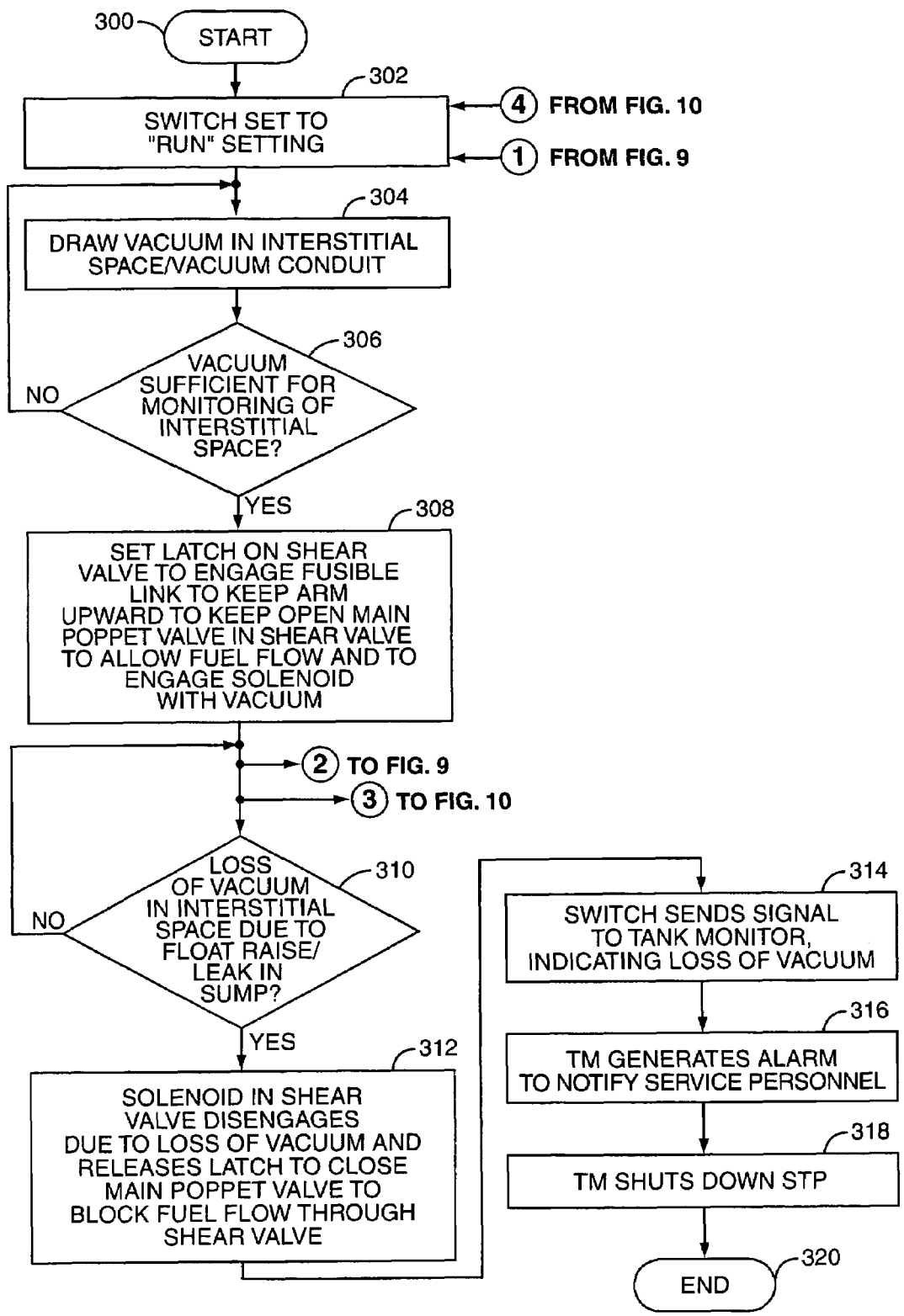
FIG. 8 is a flowchart illustration of the process to control the opening and closing of the vacuum actuated shear valve in response to detection of a loss of vacuum in accordance with the system in FIG. 7.

The flowchart in FIG. 8 illustrates the process whereby the product line shear valve 116 automatically closes in response to a leak in the fuel dispenser sump 24. The process starts (block 300), and the service switch 248 is set to the "RUN" setting 256 (block 302). Thereafter, a vacuum is drawn inside the vacuum conduit 176 using a vacuum-generating source (block 304). The vacuum conduit 176 may be connected to the interstitial space of one or more fuel-handling components as previously described above. The vacuum-generating source continues to draw a vacuum in the vacuum conduit 176 until it a sufficient vacuum level is present to actuate the vacuum actuator 186 (decision 306). The vacuum actuator 186 is designed to respond to a vacuum level that is also sufficient to be indicative of the lack of a leak in a fuel-handling component's interstitial space coupled to the vacuum actuator 186. Once the vacuum level is sufficient in the vacuum conduit 176 (decision 306), the vacuum actuator 186 applies a pulling force on the latch 178 of the shear valve 116, 1117 to open the main poppet valve inside the flow path of the product line shear valve 116, 117 and to keep it open (block 308).

Thereafter, the system remains operational and the product line shear valve 116 open until a loss of vacuum occurs. The loss of vacuum may occur due to a leak in interstitial space coupled to the vacuum actuator 186 or a leak in the fuel dispenser sump 24. If there is a leak in the fuel dispenser sump 24, the float 234 will rise and eventually cause the vent 240 to open, thereby allowing air into the vacuum conduit 176 that is coupled to the vacuum actuator 186 (decision 310). Once a vacuum loss occurs, the vacuum actuator 186 causes the flow path of the shear valve 116, 117 to close (block 312). A communication line 243 is coupled between the float valve 238 and the tank monitor 168 so that an opening of vent 240 causes a signal to be sent to the tank monitor 168 to inform the tank monitor 168 that a leak has occurred in the fuel dispenser sump 24 (block 314). The tank monitor 168 can generate the appropriate notification or alarm to alert service personnel either on-site or remotely (block 316). The tank monitor 168 may, in response to the leak, cause the submersible turbine pump 82 to shut down so that fuel 80 does not continue to be supplied to the leak (block 318). Thereafter, the process ends (block 320).

Service Switch

Another aspect of the present invention takes advantage of the vacuum-actuated shear valve 116 to divert the shear valve 116 to automatically close in response to a servicing of the fuel dispenser 10 by service personnel as a safety precaution. In this manner, the main fuel pipings 106 are depressurized automatically without service personnel having to manually close the product line shear valves 116 when servicing fuel-handling components.

The system is designed so that when a loss of vacuum occurs in the conduit 244, a loss of vacuum also occurs in the conduit 250 coupled to a service switch 248 that controls the operation of the system of the present invention. The service switch 248 has a lever 254 that controls the operation of the service switch 248. When the service switch lever 254 is set to the "RUN" position 256, the conduit 250 and the conduit 264 are coupled to each other so that a loss of vacuum that occurs in the conduit 250 is communicated to conduit 264. Since conduit 264 is coupled to the vacuum conduit 176 of the vacuum actuator 186 on the product line shear valve 116, any loss of vacuum in the conduit 264 will cause the product line shear valve 116 to close as previously discussed.

The service switch 248 also has a "SERVICE" setting 258 that service personnel can switch the lever 254 to for servicing the fuel dispenser 10. When service personnel services the fuel dispenser 10, they are supposed to manually release the latch 178 from the fusible link 188 to close the product line shear valve 116 so that the fuel-handling components and piping inside the fuel dispenser 10 are depressurized for safety reasons. However, this safety feature relies on manual intervention by service personnel that if not remembered and taken, can introduce human error that can lead to pressurized fuel 80 spilling onto service personnel when servicing the fuel dispenser 10. When the service is complete, the service personnel is supposed to reset the latch 178 on the product line shear valve 116 to again connect it to the fusible link 188 to open the product line shear valve 116 for normal operation. Therefore, since the present invention provides a method of automatically closing the product line shear valve 116 due to a loss of vacuum, the service switch 248 can be designed so that the lever 254 being set to the "SERVICE" setting 258 causes a loss of vacuum in the conduit 264 that is coupled to the vacuum conduit 176 and the vacuum actuator 186. In this manner, the product line shear valve 116 will automatically close when the fuel dispenser 10 is being serviced after the "SERVICE" setting 258 is selected.

In this regard, the service switch 248 contains a vent 252 that opens to allow air in when the lever 254 is switched to the "SERVICE" setting 258. This in turn causes air to come into the service switch 258 and into the conduit 264, which causes a loss of vacuum in the vacuum conduit 176 and actuates the vacuum actuator 186 to close the product line shear valve 116. When the service switch 248 is set back to the "RUN" setting 258, thereby closing vent 252, and when a sufficient vacuum level is applied to the vacuum conduit 176 via a vacuum-generating source, the vacuum level will cause the vacuum actuator 186 to automatically open the flow path of the product line shear valve 116. Thus, when a service person is finished servicing the dispenser, service personnel do not have to reset the product line shear valve 116. The product line shear valve 116 automatically resets to the open position when a sufficient vacuum level is once again established (i.e. no leak).

Figure 9:
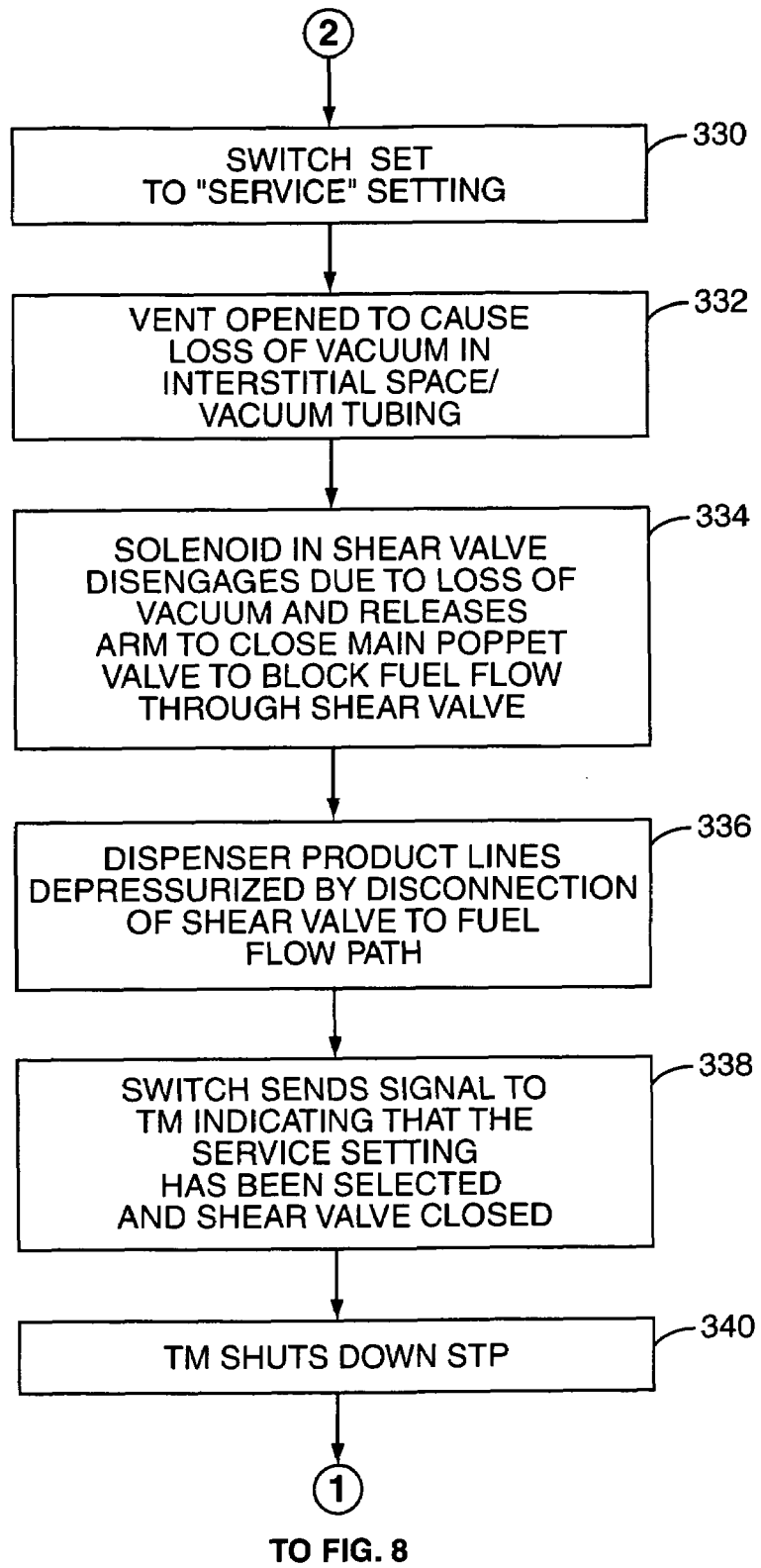
FIG. 9 is a flowchart illustration of the process to control the opening and closing of the vacuum actuated shear valve based on a service setting.

In the flowchart of FIG. 9, the process is illustrated whereby the product line shear valve 116 closes in response to the service switch 248 being set to a "SERVICE" setting so that the internal fuel dispenser piping 124 carrying the fuel 80 to the fuel filter 128 is depressurized as previously discussed. The process starts the same as described in FIG. 8 between blocks 300-308. After step 308 is performed in FIG. 8, the process goes to block 330 in FIG. 9 where the service switch 248 is set to the "SERVICE" setting 258. Thereafter, the vent 252 is opened to allow air to come into the conduit 264 that causes a loss of vacuum in the vacuum conduit 176 (block 332) and causes the vacuum actuator 186 to close the product line shear valve 116 (block 334). Thereafter, the internal fuel dispenser pipings 124 are depressurized due to the closing of the flow path in the product shear valve 116 (block 336). The service switch 248 may also activate a signal to be sent over communication line 249 coupled to the tank monitor 168 to alert the tank monitor 168 that the "SERVICE" setting 258 has been selected and that the product line shear valve 116 has been closed as a result (block 338). Thereafter, the tank monitor 168 may shut down the STP 82 if so configured, so that the main fuel piping 106 on the inlet side of the product line shear valve 116 is depressurized as well (block 340). The process returns to block 302 in FIG. 8 whenever the service switch 248 is set back to the "RUN" setting 256 and a sufficient vacuum level is restored in the vacuum conduit 176.

Filter Interlock

Another aspect of the present invention takes advantage of the vacuum-actuated product line shear valve 116 to provide the automatic closing of the product line shear valve 116 in response to servicing of the fuel filter 128 in the fuel dispenser 10. In this manner, service personnel do not have to manually close the product line shear valves 116 to depressurize the main fuel piping 106 when changing the fuel filter 128 as a safety feature.

The fuel dispenser 10 typically contains a replaceable fuel filter 128 inline to each internal fuel dispenser piping 124 to prevent contaminants from entering the fuel flow meter 56 and passing on to a customer's vehicle, as is well known. Over time, service personnel must remove and replace the fuel filter 128 with a new filter in order to prevent the fuel filter 128 from becoming clogged and blocking the flow of fuel 80 through the fuel dispenser 10. Because the fuel filter 124 is coupled inline to the fuel delivery piping 124 of a fuel dispenser 10, the fuel 80 inside the fuel filter 128 and the piping 124 entering and leaving the filter is pressurized, thereby causing the potential of the fuel 80 to squirt out onto the service personnel when the fuel filter 128 is removed. Therefore, since the present invention provides a method and system of automatically closing the product line shear valve 116 in response to a vacuum loss, the present invention can also be designed to cause a vacuum loss in the vacuum conduit 176 and to the vacuum actuator 186 to close the flow path of the product line shear valve 116 in response to the removal of a fuel filter 128 in the fuel dispenser 10. In this manner, the internal fuel dispenser piping 124 is depressurized by closing off the STP 82 pump force from the fuel filter 128 by the closing of the product line shear valve 116.

Turning again to FIG. 7, the conduit 264 is coupled to the vacuum conduit 176 and conduit 266 through use of a T-style fitting 260 and connectors 246. Therefore, a loss in vacuum in conduit 266 will also cause a loss in vacuum in the vacuum conduit 176, which will in turn cause the vacuum actuator 186 to close the shear valve 116 as previously described. The conduit 266 is run outside of the fuel dispenser sump 24 up into the fuel dispenser 10 and into an interlock valve 268 that is coupled to fuel filter coupling 126 via fitting 272. A vent 270 is coupled to the interlock valve 268. The interlock valve 268 can be manually opened and closed, or can be designed so that in order for service personnel to remove the fuel filter 128, the interlock valve 268 must be opened. When the interlock valve 268 is opened (or closed depending on the design), a vent 270 is opened, thereby allowing air to enter inside the conduit 266. This in turn causes a loss of vacuum in conduit 264, which also causes a loss of vacuum in the vacuum conduit 176. The vacuum actuator 186 closes the product line shear valve 116 in response. Therefore, when the fuel filter 128 is to be changed, the automatic closing of the product line shear valve 116 automatically depressurizes the internal fuel dispenser piping 124 coupled to the fuel filter 128 as well as the fuel 80 trapped inside the internal fuel piping 124, before it can be removed, thereby preventing the fuel from squirting onto service personnel due to the pressure build-up.

Figure 10:
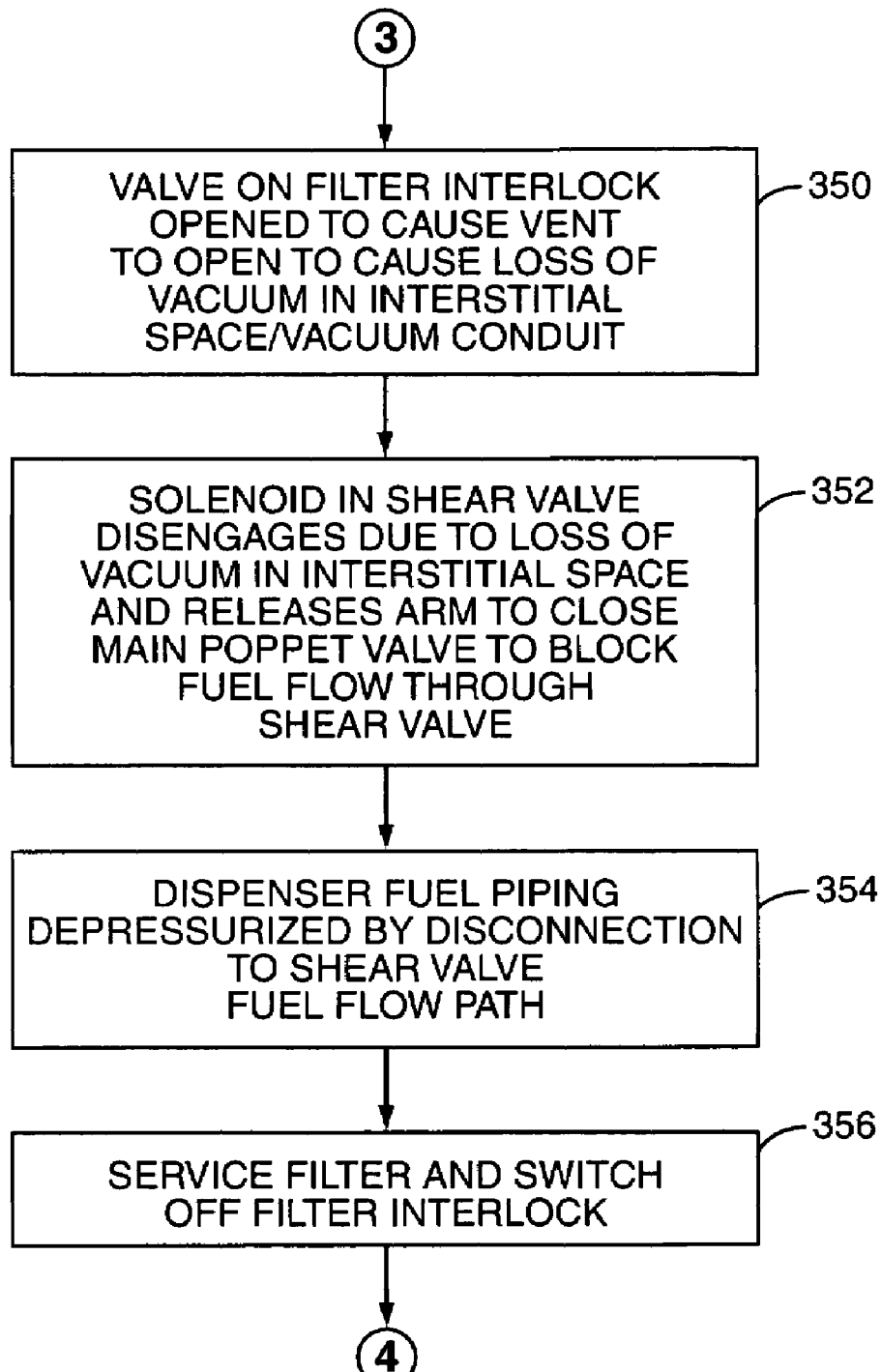
FIG. 10 is a flowchart illustration of the process to control the opening and closing of the vacuum actuated shear valve to a filter interlock activated when servicing a filter in the fuel dispenser.

In the flowchart of FIG. 10, the process is illustrated whereby the product line shear valve 116 closes in response to the interlock valve 268 being closed or opened. When the vent 270 is opened, a loss of vacuum occurs in the vacuum conduit 176, thereby causing the vacuum actuator 186 to automatically close the product line shear valve 116 in response as a safety measure. The process is the same as described in FIG. 8 between blocks 300-308. After step 308 is performed in FIG. 8, the process goes to block 350 in FIG. 10, where the vent 270 is opened in response to an activation of the interlock valve 268 either manually or by service personnel attempting to remove a fuel filter 128 inside the fuel dispenser 10. The opening of vent 270 allows air to come into the conduit 246 causing a loss of vacuum in the vacuum conduit 176, thus causing the vacuum actuator 186 to close the product shear valve 116 (block 352). Thereafter, the internal fuel dispenser piping 124 is depressurized due to the closing of the product line shear valve 116 (block 354). Service personnel can then replace the fuel filter 128 with a new filter without fear of pressurized fuel being present in the internal fuel dispenser piping 124. After the fuel filter 128 is replaced, the interlock valve 268 is reset to close vent 270 (block 356). This allows a vacuum level to be regenerated in the vacuum conduit 176 in order to cause the vacuum actuator 186 to eventually open the product line shear valve 116. The process returns to block 302 in FIG. 8 whenever the service switch 248 is set to the "RUN" setting 256 for normal operation.

Dispenser Sumps

Figure 11:
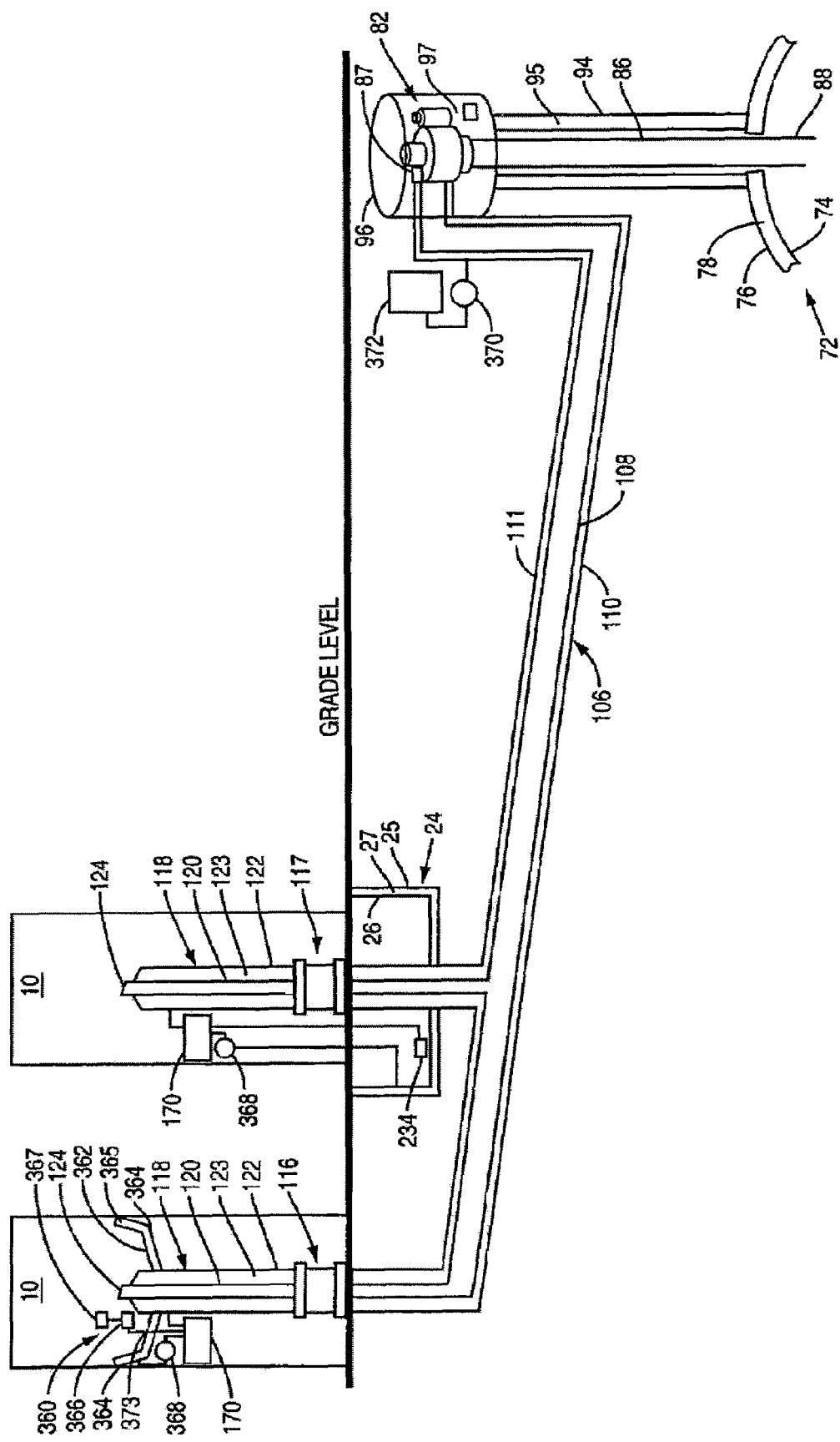
FIG. 11 is an illustration of two embodiments of a secondarily contained and monitored fuel dispenser containment sump.

The present invention also involves the use of an in-dispenser sump or containment pan 360 as an alternative or supplement to the below ground fuel dispenser sump 24, as illustrated in FIGS. 3 and 11. In this manner, any leaks that occur in fuel-handling components located above the in-dispenser sump 360 are captured. The in-dispenser sump 360 may be used to effectively provide secondary containment for capturing leaks for fuel-handling components internal to the fuel dispenser 10 where providing of secondary containment in other methods is not possible or impracticable for space and/or cost reasons. In the illustrated embodiment, the in-dispenser sump 360 is comprised of a main plate 362 that runs across the width of the fuel dispenser 10. The main plate 362 contains protruding edges that tilt upward on the far ends of the main plate 362 to capture leaks that occur above the main plate 362. The main plate 362 is slanted upward on both sides of its center so that when a leak is captured by the main plate 362, gravity will pull and collect the leak in the center of the main plate 362.

The main plate 362 contains orifices 373 for the internal fuel dispenser piping 118, 134 to run through the main plate 362 to other components of the fuel dispenser 10 above the plate 362. The piping 118, 134 are sealed around the orifice 373 with a potting or epoxy compound typically. In this manner, any leaked fuel captured by the main plate 362 will gravitate and pool up in the center of the main plate 362 without leaking through the orifice 373. A low-level liquid sensor 366 is placed proximate to the center of the main plate 362, and preferably, in a trough or catchment container 374 either coupled to the main plate 362 or integrally formed into the main plate 362, at the lowest level to detect any presence of leaked fuel 80. A high level liquid sensor 367 is placed similarly, but at a designated liquid level to only detect when leaks accumulate to a certain defined liquid level in the in-dispenser sump 360 as a redundancy sensor in case the low level liquid sensor 366 fails. Both the low-level liquid sensor 366 and the high liquid level sensor 367 are communicatively coupled to the DSM 170 via communication lines (not labeled) so that such leaks are detected and communicated to the DSM 170. The DSM 170 provides for controlling the secondary containment of the fuel dispenser 10 in the service station as will be described below in this application.

Because the main plate 362 acts to capture leaks, the main plate 362 may also be secondarily contained in case the main plate 362 is breached or contains a leak to prevent the captured fuel 80 from leaking to the environment. Thus, the in-dispenser sump 360 is comprised of a double-walled plate structure. The main plate 362 is supported by an outer, secondary plate 364. An interstitial space 365 is formed by the space between the main plate 362 and the secondary plate 364. In this manner, the interstitial space 365 will hold any leaks that occur as a result of a breach or leak in the main plate 362 when a leak has occurred in a fuel-handling component located above the main plate 362. Because of the interstitial space 365 provided, this interstitial space 365 can be monitored for leaks or breaches using a vacuum-generating source, just as previously described above for the below ground fuel dispenser sump 24 and other fuel-handling components. Further, if the interstitial space 365 of the in-dispenser sump 360 is fluidly coupled to the vacuum conduit 176 that is connected to the vacuum actuator 186 of the product line shear valve 116 as illustrated in FIG. 7, a leak in the in-dispenser sump 360 will cause a loss of vacuum that will cause the product line shear valve 116 to automatically close, thereby preventing more fuel 80 from reaching the leaky fuel-handling component that is causing the leak captured by the main plate 362.

An interstitial liquid sensor 368 may also be fluidly coupled to the dispenser sump interstitial space 365 to detect leaks in the interstitial space 365. If a leak is detected, a signal will be communicated to the DSM 170. The DSM 170 can in turn control devices that are designed to cause a loss of vacuum at the vacuum actuator 186 to cause the product line shear valve 116 to close automatically.

If a below ground fuel dispenser sump 24 is provided as an alternative to the in-dispenser sump 360, the below ground fuel dispenser sump 24 may also be fitted with the interstitial liquid sensor 368 that is fluidly coupled to its interstitial space 27 so that a breach of the inner container 26 of the below ground fuel dispenser sump 24 will also cause a signal to be generated to the DSM 170. Again, the DSM 170 can cause a loss of vacuum at the vacuum actuator 186 to automatically close the product line shear valve 116. As an alternative, a brine solution may be used to fill the interstitial space 27 using a brine sensor (not shown) to detect a leak in the below ground fuel dispenser sump 24. Further, this embodiment may be used for customers that do not employ fuel dispensers 10 containing an in-dispenser sump 360, but rather a below ground fuel dispenser sump 24.

Dispenser Sensor Module (DSM)

FIG. 12 illustrates more detail of the secondary containment monitoring and control system for the in-dispenser sump interstitial space 365 and internal fuel dispenser piping interstitial spaces 123, 139 to detect leaks, as described above. As illustrated, the DSM 170 provides various interfaces to components used to monitor and detect leaks as will be described in more detail throughout the remainder of this application. Some of these features are described generally below with respect to FIG. 12. The remaining figures and descriptions that follow describe these features and functions in more detail.

Leak Sensors

As illustrated in FIG. 12, the DSM 170 contains a pressure transducer 386 that is fluidly coupled to the interstitial liquid sensor 368 and the in-dispenser sump interstitial space 365. Thus, when a leaks occurs in the in-dispenser sump interstitial space 365, either a liquid leak is detected by the interstitial liquid sensor 368, or pressure variations due to loss of vacuum are detected by the pressure transducer 386. In either case, this condition is communicated to DSM 170 for processing and providing control, including causing the vacuum actuator 186 to lose vacuum and close the product line shear valve 116 as a result, which will be described below.

End-of-Zone Sensors

End-of-zone or end-of-line sensors (VS1) 376, 381 that are fluidly coupled to ends of the interstitial spaces or lines of the internal fuel dispenser and vapor piping interstitial spaces 123, 139 may also be provided via ports 379, 383. If the end-of-zone sensors 376, 381 do not detect a sufficient vacuum level present in these interstitial spaces 123, 139 when a vacuum-generating source is applied, this is an indication of either a leak or blockage in the interstitial spaces 123, 139. If a blockage exists in the interstitial space 123, 139, pressure variations may not be detectable by the end-of-zone sensors 376, 381 since the sensors 376, 381 are closed off from vacuum generated in the interstitial spaces 123, 139. The end-of-zone sensors 376, 381 provide signals to the DSM 170 to allow this condition to be detected for proper operation of the system.

Redundant Vacuum Sources

Because a vacuum-generating source applies a vacuum to the internal fuel dispenser piping interstitial spaces 123, 139, this same vacuum-generating source can also be used to apply a vacuum to the in-dispenser sump interstitial space 365 or below ground fuel dispenser sump interstitial space 27 for monitoring of leaks as well as a convenience. In this manner, a separate vacuum-generating source is not required to draw a vacuum level in the fuel dispenser sump interstitial spaces 27, 365 for monitoring of leaks. This is particularly beneficial if an in-dispenser sump 360 is used in the dispenser 10, as illustrated in FIG. 12, because the in-dispenser sump 360 is located in relatively close proximity to the internal fuel dispenser piping 118.

Two of the end-of-zone sensors 376 for the product piping interstitial spaces 123 are fluidly coupled to latching valves 380A, 380B (CV-1A, CV-1B), which are both fluidly coupled to the pressure transducer 386, the interstitial liquid sensor 368 and the in-dispenser sump interstitial space 365. Note that both Product A and Product B's interstitial space 123 is fluidly coupled to the in-dispenser sump interstitial space 365 via the latching valves 380A, 380B. In this manner, a vacuum-generating source applying a vacuum to either Product A or Product B's interstitial space 123 can be used to also generate a vacuum level in the in-dispenser sump interstitial space 365. The in-dispenser sump interstitial space 365 is only fluidly coupled to one of the product's interstitial spaces 123 at a time since the latching valves 380A, 380B are controlled for only one to open at a time. In this manner, if the vacuum-generating source cannot maintain a vacuum level in a particular product piping's interstitial space 123 due to a leak in that product's internal fuel dispenser piping 118, the latching valves 380A, 380B openings can be switched so that the in-dispenser sump interstitial space 365 can be drawn under a vacuum from another product's interstitial space 123. This system provides a redundancy for the vacuum source to the in-dispenser sump interstitial space 365 so that it can be continued to be monitored for leaks, even if one of the internal fuel dispenser product lines 118 contains a leak sufficient for a loss of vacuum to occur to prevent its vacuum level from being able to properly generate a vacuum level in the in-dispenser interstitial space 365.

Note that a redundant system is not required for the present invention. Only one product line's interstitial space 123 may be coupled to the in-dispenser sump interstitial space 365. Further, more than two product lines' interstitial spaces 123 may be coupled to the in-dispenser sump interstitial space 365 if triple or greater redundancy is desired. In this case, another latching valve would be provided for the extra interstitial space 123 sources so that only one is coupled to the in-dispenser sump interstitial space 365 to generate a vacuum level for leak monitoring at one time.

Also, note that the product line interstitial space 123 may be fluidly coupled to the below ground fuel dispenser sump 24, and in particularly its interstitial space 27 (as illustrated in FIG. 1) in a similar manner to use the same vacuum-generating source to draw a vacuum in the fuel dispenser product lines 118 and the below ground fuel dispenser sump interstitial space 27 as well.

Vacuum Actuator Shear Valve Control

The DSM 170 controls a pilot control valve (CV-3) 390 in order to pneumatically control the opening and closing of the product line shear valves 116 via control of the vacuum actuators 186. The pilot control valve 390 is activated to couple a vacuum from the dispenser product level 118 that is also coupled to the fuel dispenser sump 24, 360 to generate a vacuum level in the dispenser sump interstitial spaces 37, 356. Thus, if the pilot control valve 390 couples the vacuum level to the vacuum actuator 186, the product line shear valves 116 will be open. The vacuum actuators 186 and their control of the product line shear valves 116 was previously described in detail with regard to FIGS. 4-6. If the DSM 170, through its components, detects a leak or breach in the secondary containment systems, including the internal fuel dispenser piping 118, 134, or the in-dispenser sump 360 or below ground fuel dispenser sump 24, the DSM 170 causes the pilot valve 390 to pneumatically cause a loss of vacuum to be applied to the vacuum actuators 186 on the product line shear valves 116 to close the shear valves 116 as well be described in more detail below and illustrated in FIG. 13.

Exemplary Secondary Containment Monitoring and Control System Architecture and Operation Now that monitoring and control components of the secondary monitoring and control system have been described in general, the application now describes the operation of the system in more detail with respect to a preferred embodiment. FIGS. 13-19 describe this embodiment of an overall secondary containment and monitoring system according to the preferred embodiment present invention.

DSM Package

Figure 13:
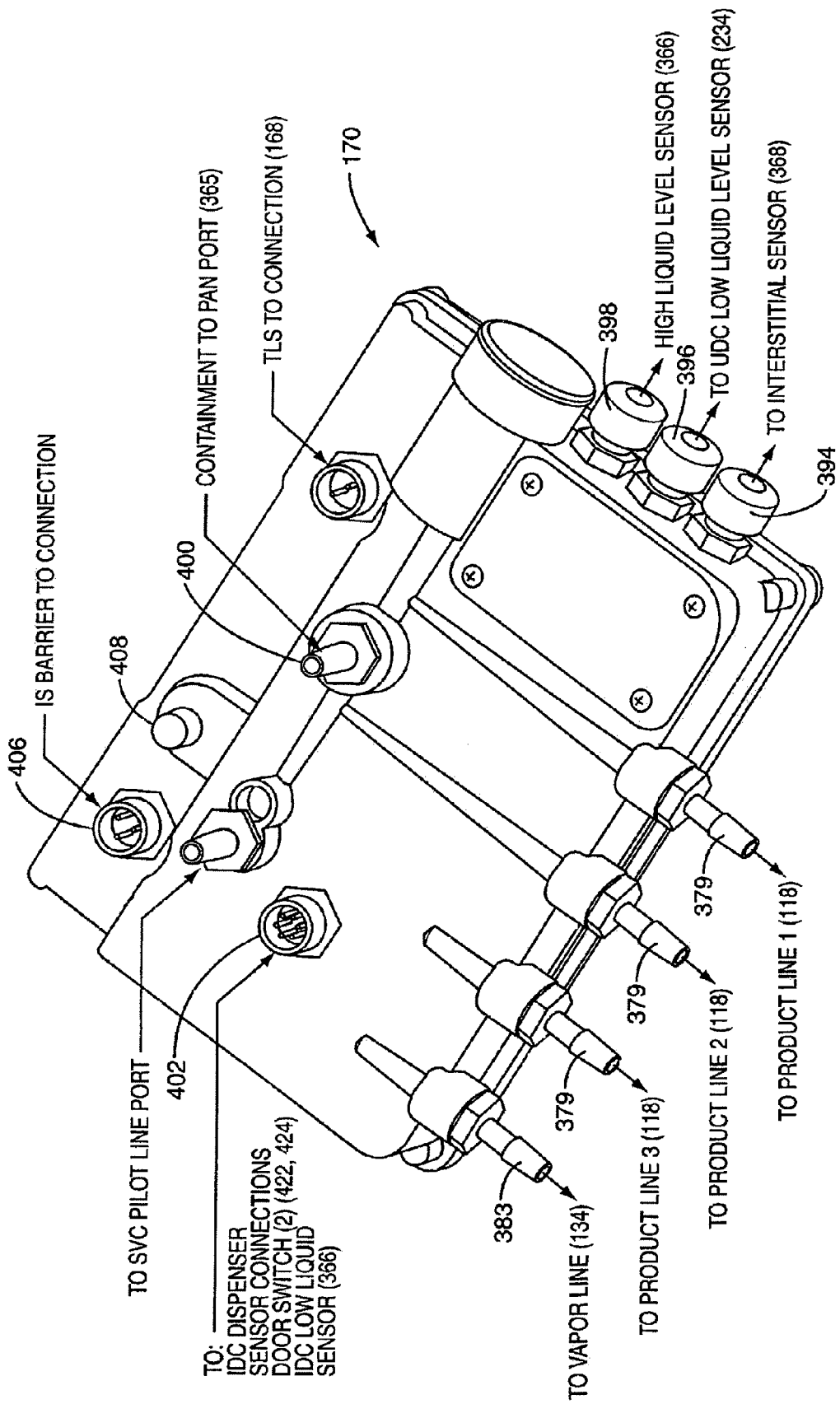
FIG. 13 is an illustration of a dispenser sensor module (DSM) used to interface with the secondary containment of fuel-handling components to control vacuum level and monitor for leaks in accordance with the present invention.

As an introduction to the control module for the secondary containment and monitoring system according to one embodiment, FIG. 13 illustrates the DSM 170 package and its various ports and interfaces to provide the secondary containment monitoring and control system in accordance with one embodiment of the present invention. These interfaces and functions will be described in more detail below. However, these elements are briefly introduced herein with respect to FIG. 12.

The DSM 170 contains the necessary hardware and electronics related to the secondary containment and monitoring system for individual fuel dispensers 10 in the system. A DSM 170 is provided for each fuel dispenser 10. The DSM 170 is provided in an enclosure that resides in the hydraulics cabinet of the fuel dispenser 10 or underneath the below ground fuel dispenser sump 24. These areas are Class 1, Division 1 areas requiring intrinsically safe connections. The enclosure is sealed from environmental conditions, such as water, fuel, oil, and vapors. The enclosure provides connections for the electrical and pneumatic components and accessories to provide the secondary containment monitoring and control system as described herein.

As illustrated in FIGS. 12 and 13, the DSM 170 contains ports 379, 383 to couple to the internal fuel dispenser piping interstitial spaces 123, 139, or more generally the fuel dispenser piping 118 and the vapor return piping 134. The ports 379, 383 may be designed to connect to ¼ inch vacuum tube with a 7/16"-20 SAE threaded fitting to connect the ports 379, 383 to couple the interstitial spaces of the product lines 123 and the vapor line 139 for example. The ports 379, 383 can be either molded, machined, bonded, or ultrasonically welded to the DSM 170.

As previously described above, the DSM 170 coupling to the interstitial spaces of the product lines 123 and vapor line 139 allows the DSM 170 to couple the pressure transducer 368 to these spaces for detection of a leak via pressure variation monitoring as previously described and illustrated in FIG. 12. A similar port 400 is provided to the couple the pressure transducer 368 to the dispenser sump interstitial space 365 for monitoring the in-dispenser sump 360 for leaks as well, as previously described and illustrated in FIG. 12.

Ports 394, 396, 398 are provided for the DSM 170 to interface to the interstitial liquid sensor 368 and the in-dispenser sump low level liquid sensor 366 and below ground fuel dispenser liquid sensor 234 (the float) to detect liquid leaks in the fuel-handling components as previously discussed and illustrated in FIG. 11. These ports allow the DSM 170 to detect a liquid leak in either the interstitial space 365, 27 of the dispenser sumps, or their inner containers 362, 26 as part of the control system 46.

The DSM 170 contains an interface to the tank monitor 168. Some of the decision making and logic of the control system may reside in the tank monitor 168 as opposed to the DSM 170, as well be discussed below. For connections between the DSM 170 and components in the fuel dispenser 10, including power and status, an IS barrier connection 406 is provided on the DSM 170. Since the DSM 170 is obtaining power from the fuel dispenser 10 for some of its components, the DSM 170 must interface through an IS barrier of the fuel dispenser 10 into a protected Class 1, Division 1 area. The DSM 170 also contains a port 402 for other connections to door switches and the in-dispenser sump low level liquid sensor 366, which are used by the DSM 170 to actuate the product line shear valves 116 to close among other conditions when activated.

A reset button 408 is provided to reset the electronic controllers (e.g. microcontrollers) inside the DSM 170 in case of a hardware hang-up. The reset button 408 may be a SPST momentary "on" type switch, such that the amount of time the switch is depressed will not effect operations or control by the DSM 170.

Circuit Diagram

Figure 14:
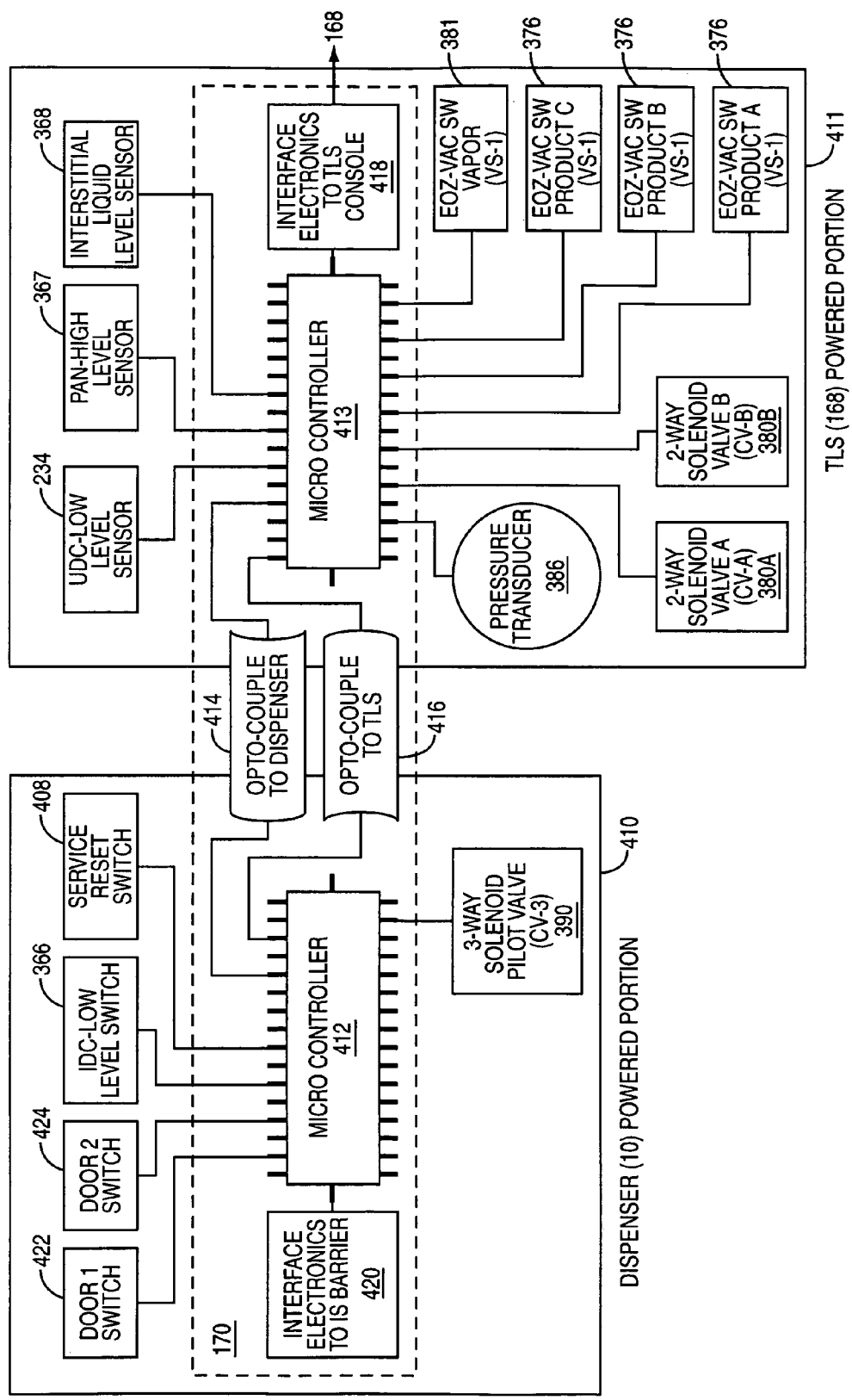
FIG. 14 is a pneumatic diagram illustrating the operational components of the secondary containment system according to the present invention.

FIG. 14 contains an overall view and illustration of the circuit diagram of the secondary containment monitoring and control system according to the preferred embodiment present invention. Several of the control and monitoring components are disclosed which provide electronic control of certain features and functions described below. In this embodiment, the DSM 170 consists of two distinctly powered portions indicated as the "Dispenser-Powered Portion" 410 and the "TLS Powered Portion" 411. The "TLS" is the tank monitor 168. The "Dispenser-Powered Portion" 410 contains a dispenser-powered microcontroller 412 on a printed circuit board (PCB) to provide a means to accept power from a source other than the tank monitor 168. The first microcontroller 412 receives power from the fuel dispenser 10 through an intrinsically safe connection (illustrated in FIG. 16).

One function of the dispenser-powered microcontroller 412 is to interface with the 3-way solenoid pilot control valve (CV-3) 390 (previously illustrated and discussed in FIG. 12) to communicate with and control the vacuum actuators 186 to close the product line shear valves 116 according to designed logic conditions being present. More details on the pneumatic operation of the pilot control valve 390 and its communication to the vacuum actuators 178 is described later below and illustrated in FIG. 15. Control of the pilot control valve 390 is one of the more critical functions since this valve controls the vacuum actuators 178 that control the closing of the product line shear valves 116 in response to a leak or other condition where closing the product line shear valves 116 is desired. These conditions are described in more detail below.

The dispenser-powered microcontroller 412 accepts as inputs, dispenser door switches 422, 424, the reset switch 408, and the in-dispenser sump low liquid level sensor 366, as illustrated in FIG. 14. If the dispenser-powered microcontroller 412 receives a signal from one of the dispenser door switches 422, 424, which indicates that a fuel dispenser 10 cabinet door 23 (illustrated in FIGS. 1 and 3) has been opened, the microcontroller 412 instructs the pilot control valve 390 to communicate with the vacuum actuators 186 to close the product line shear valves 116 as a safety precaution. There is typically one door switch 422, 424 per fuel dispenser door. There are typically two doors 23 per fuel dispenser 10; one on each side of the fuel dispenser 10. The door switches 422, 424 are coupled to the dispenser-powered microcontroller 412 as opposed to a tank monitor-powered microcontroller 413 so that the pilot control valve 390 can continue to be controlled by the dispenser-powered microcontroller 412 if the tank monitor 168 loses power or otherwise malfunctions. The status of the door switches 422, 424 will also be communicated from the dispenser-powered microcontroller 412 to the tank monitor 168. This provides a status to the tank monitor 168 to indicate that the product line shear valves 116 have been closed due to the cabinet door 23 opening.

If the dispenser-powered microcontroller 412 receives a signal from the in-dispenser sump low level liquid switch 366 indicating that a leak is present above the main leak plate 362, the microcontroller 412 instructs the pilot control valve 390 to communicate with the vacuum actuators 186 pneumatically to cause a loss of vacuum applied to the vacuum actuators 178 to in turn close the product line shear valves 116 to prevent fuel 80 from being further supplied to the source of the leak. The in-dispenser low liquid level sensor 366 is coupled to the dispenser-powered microcontroller 412 so that the in-dispenser sump 360 is continuously monitored regardless of the status of the tank monitor 168. In this manner, if the tank monitor 168 loses power or malfunctions in any other capacity, the in-dispenser sump 360 continues to be monitored for leaks since it is powered by the dispenser-powered microcontroller 412 rather than the tank-monitor powered microcontroller 413. The "Dispenser-Powered Portion" 410 of the DSM 170, and in particular the dispenser-powered microcontroller 412, communicates information to the fuel dispenser 10 via interface electronics 420 coupled to optic-couplers 464 to a dispenser IS barrier 466. As discussed in FIG. 16 below, status information may be communicated from the dispenser-powered microcontroller 412 to the fuel dispenser 10 regarding the secondary containment monitoring and control system through the dispenser IS barrier 466.

The dispenser-powered microcontroller 412 also communicates and receives information to a second portion of the DSM 170 labeled the "TLS Powered Portion" 411 through optic-couplers 414, 416 to a second, tank monitor-powered microcontroller 413. The tank monitor-powered microcontroller 413 is provided as part of a second PCB in the DSM 170 that receives inputs from the below ground dispenser sump low level liquid switch 234, the in-dispenser sump high level liquid sensor 367, and the interstitial liquid level switch 368. The tank-monitor powered microcontroller 413 communicates with the tank monitor 168 via interface electronics 418 using a protocol, such as the Veeder-Root Smart Sensor protocol for example. If any of these switches or sensors indicates a leak in any monitored interstitial space of a fuel-handling component or liquid in the fuel dispenser sump 24, 360, the status is communicated to the tank monitor 168. The logic of the tank monitor 168 can direct the dispenser-powered microcontroller 412 to close the pilot control valve 390, which in turn causes a loss of vacuum that will cause vacuum actuators 186 to close the product line shear valves 116 if any of these switches indicates a leak.

The tank monitor 168 continuously updates a pilot control valve 390 open signal and sends this signal to the dispenser-powered microcontroller 412 via the tank monitor-powered microcontroller 413. The tank monitor 168 must continue to update the pilot control valve open signal in order for the dispenser-powered microcontroller 412 to keep the pilot control valve opened to in turn keep the product line shear valves 116 opened. The dispenser-powered microcontroller 412 contains a timeout circuit to ensure that the pilot control valve status signal is received by the tank monitor 168 with a specified period. If either the below ground dispenser sump low level liquid switch 234, the in-dispenser sump high level liquid switch 367, or the interstitial liquid level sensor 368 indicate a leak, the tank monitor 168 will not send an updated pilot control valve 390 open signal. This will cause the dispenser-powered microcontroller 412 to timeout waiting for the pilot control valve open signal and in response close the pilot control valve 390 thereby causing a loss of vacuum at the vacuum actuators 178. This will in turn cause the product line shear valves 116 to close. Further, because of this timeout design, any loss of power or malfunction in the tank monitor 168 that prevents the tank monitor 168 from sending out an updated pilot control valve 390 open signal which will cause the dispenser-powered microcontroller 412 to close the pilot control valve 390 to cause the loss of vacuum to in turn close the product line shear valves 116 as a safety precaution.

Because control of the pilot control valve 390 is critical in the secondary containment and monitoring system, it was designed for the dispenser-powered microcontroller 412 rather than the tank monitor-powered microcontroller 413 to control the pilot control valve 390. In this manner, if the tank monitor 168 loses power or otherwise malfunctions, the dispenser-powered microcontroller 412, by being independently powered, can close the pilot control valve 390 to in turn close the product line shear valves 116 even if the tank monitor 168 malfunctions.

The below ground dispenser sump low level liquid sensor 234 is coupled to the tank-monitor powered microcontroller 413. The sensor 234 communicates whether leaked fuel has been collected in the below ground dispenser containment sump 24. This sensor 234 is coupled to the tank monitor-powered microcontroller 413 so that the tank monitor 168 can monitor the leak status during its normal polling process. If the tank monitor 168 determines that a leak is contained in the below ground dispenser sump 24, the tank monitor 168 will not update the pilot control valve 390 open signal, which will in turn cause the pilot control valve 390 to be closed by the dispenser-powered microcontroller 412, causing a loss of vacuum at the vacuum actuators 178. This will close the product line shear valves 116 for the fuel dispenser 10 whose below ground dispenser sump 24 captured a leak.

The in-dispenser sump high liquid level sensor 367 is also coupled to the tank monitor-powered microcontroller 413. The sensor 367 communicates to the tank monitor-powered microcontroller 413 the status of the in-dispenser sump 360 and whether it has captured a leak at the prescribed level detected by the sensor 367.

The in-dispenser sump high liquid level sensor 367 is coupled to the tank monitor-powered microcontroller 413 since the sensor 367 is not provided as part of the DSM 170. The fuel dispenser 10 manufacturers decide if the sensor 367 will be provided as part of their fuel dispenser 10. If the tank monitor 168 detects a leak via a status of the in-dispenser sump high liquid level sensor 367, the tank monitor 168 may direct the dispenser-powered microcontroller 412 to close the pilot control valve 390 to in turn close the product line shear valves 116 for the fuel dispenser 10 containing the leak to cut off the source of fuel 80 provided to the leak.

The interstitial liquid level sensor 368 is also coupled to the tank monitored-powered microcontroller 413. This sensor 368 communicates the status of the interstitial liquid level of the interstitial space 365 of the in-dispenser sump 360. The sensor 368 status is checked by the tank monitor 168 polling process. If the tank monitor 168 detects a leak via a status of the interstitial liquid level sensor 367, the tank monitor 168 may direct the dispenser-powered microcontroller 412 to close the pilot control valve 390 to in turn close the product line shear valves 116 for the fuel dispenser 10 containing the leak to cut off the source of fuel 80 provided to the leak.

The pressure transducer 386, the latching valves 380A, 380B (CV-1A; CV-1B) and the end-of-zone vacuum switches 376, 381 are also all coupled to the tank monitor-powered microcontroller 413. These components were previously described above with respect to FIG. 12.

The pressure transducer 386 is coupled to both the interstitial space of both the product lines 118 and one or both of the dispenser sumps 360, 24 as previously described in FIG. 12. If a leak occurs in these interstitial spaces 123, 365, 27, the pressure transducer's 386 measured pressure variation will be sensed by the tank monitor-powered microcontroller 413, which will in turn be communicated to the tank monitor 168 as part of its polling process. The tank monitor 168 will in turn direct the dispenser-powered microcontroller 412 to close the pilot control valve 390, which will in turn cause the product line shear valves 116 to be closed as a result of the leak.

The latching valves 380A, 380B are controlled by the tank monitor-powered microcontroller 413 to provide the redundant vacuum source generation for one or both of the dispenser sumps 360, 24. A vacuum level generated by a vacuum-generating source in the internal fuel dispenser piping interstitial space 123 is tapped off to also draw a vacuum level in the dispenser sump interstitial space 365, 27, as previously described and illustrated in FIG. 12, for monitoring of leaks. The tank monitor 168 only opens one of the latching valves 380A, 380B at a time, so that the vacuum generated in the dispenser sump interstitial space 365, 27 is only generated from the vacuum level generated in one product line's interstitial space 123. If a leak occurs in that product line's interstitial space 123 such that the a vacuum level cannot be maintained in the dispenser sump interstitial space 365, 27, the tank monitor 168 can open the other latching valve 380A, 380B to switch the source of vacuum generation to the dispenser sump interstitial space 365, 27 to another product line interstitial space 123. In this manner, the dispenser sump 360, 24 can continue to be monitored for leaks even if a particular product line cannot maintain a sufficient vacuum level due to a leak.

The end-of-zone switches 376, 381 are provided for each of the product lines 118 and the vapor return line piping 140 to detect if a vacuum is being properly generated to the end of each line, as previously discussed. The end-of-zone switches 376, 381 are placed at the end of each interstitial spaces 123, 139 of the product lines 118 and the vapor return line 140. In this manner, when a vacuum is generated in the product piping or vapor return line piping 118, 140, the tank monitor-powered microcontroller 413 can communicate the status of the end-of-zone switches 376, 381 to the tank monitor 168. The tank monitor 168 can in turn detect if a vacuum is being properly generated all the way to the end of the interstitial spaces 123, 139. If a vacuum level is being generated, but an end-of-zone switch 376, 381 is not properly switching due to a vacuum level being present at the end of an interstitial space line 123, 139, this is an indication of that blockage exists in the interstitial space 123, 139 since the vacuum level is not reaching the end of the interstitial space line 123, 139. Thus, without the end-of-zone switches 376, 381, the system could not distinguish a blocked line from an un-blocked line.

Pneumatic System Diagram

Now that the electrical elements of the secondary containment monitoring and control system of the preferred embodiment have been described, the pneumatic components and control functionality of the system will now be described with respect to FIG. 15.

Figure 15:
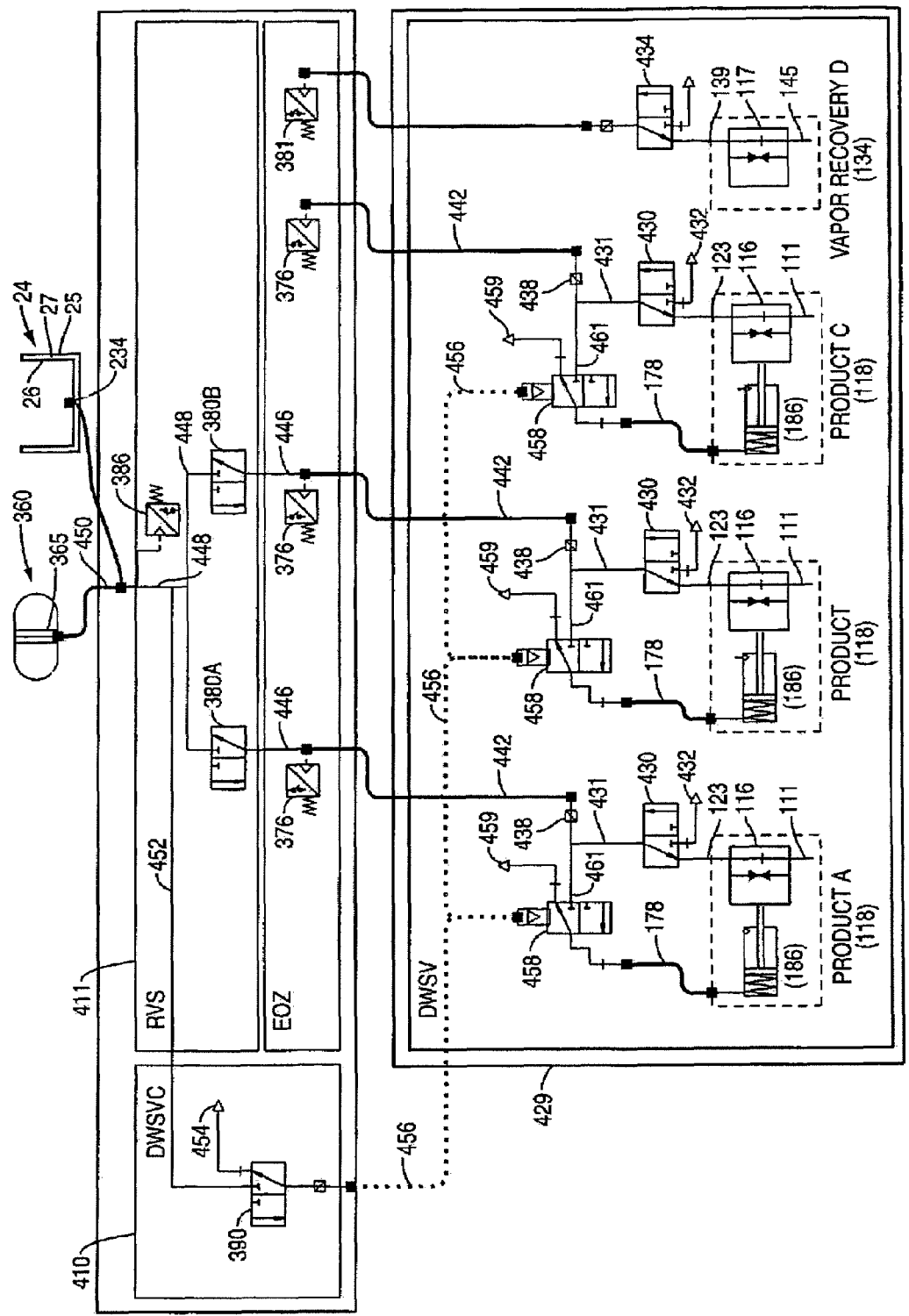
FIG. 15 is an electrical division diagram illustrating the operational components of the secondary containment system according to the present invention.

FIG. 15 illustrates a pneumatic diagram of the secondary containment monitoring and control system according to the preferred embodiment. There are three product lines shown labeled "Product Line A," "Product Line B," and "Product Line C." These lines are the product lines 118 for each fuel grades provided to the fuel dispenser 10. If the fuel dispenser 10 was a blending fuel dispenser, only two gasoline product lines would be provided as disclosed in FIG. 3: one fuel piping line 118 for the low grade of gasoline, and one fuel piping line 118 for the high grade of gasoline. The vacuum-generating source is fluidly coupled to the main fuel piping interstitial space 111, which extends through the interstitial space of double-walled shear valve 116, and into the interstitial space of the internal fuel dispenser piping 123. In a like manner, the vacuum-generating source is also fluidly coupled to the vapor line piping interstitial space 145, which extends through the interstitial space of the double-walled vapor line shear valve 117 and into the internal vapor line piping interstitial space 139. The system obtains its vacuum from the vacuum-generating source applying a vacuum to the main fuel piping interstitial space 111 and the vapor return piping interstitial space 145 in this embodiment.

The product line shear valves 116 are coupled to vacuum actuators 186 as previously described and as illustrated in FIG. 15. Since there are three fuel dispenser piping lines 118, there are three vacuum actuator 186 and product line shear valve 116 combinations for each of the lines 118. FIG. 15 only illustrates the product line interstitial spaces 111, 123 on the inlet and outlet side of the product line shear valve 116, since the vacuum level is generated in the product line interstitial spaces 111, 123. The product line shear valves 116 are double-walled shear valves so that product line interstitial space 111 is coupled to product line interstitial space 123, like illustrated in FIGS. 4-6. When no vacuum is present in the system initially, the product line shear valve 116 is closed since no vacuum is being applied to the vacuum actuator 186 to keep the product line shear valve flow path open.

Before discussing the pneumatic components in FIG. 15, the vacuum flow path opening the system is discussed. The vacuum is originally established by the vacuum-generating source in the product line interstitial space 123. From there, the vacuum is coupled to an operability valve 430, which is coupled to the product line interstitial space 123. The vacuum extends to a vacuum conduit 431 coupled to the output of the operability valve 430 and extends through a filter 438 into a second vacuum conduit 442. The filter 438 keeps debris from flowing back to the shear valve 116 interstitial space.

The second vacuum conduit 442 is coupled to the end-of-zone switch 376 and passes to the latching valves 380A, 380B, which control whether the vacuum is applied to the vacuum conduit 450 coupled to the dispenser sump interstitial space 365, 27. The end-of-zone switch 376 will activate if a sufficient vacuum level is present thereby indicating that the vacuum level was able to reach the end of the product line interstitial space 123 and thus no blockage exists, as previously discussed. Only one of the latching valves 380A, 380B is open at one time. This provides a redundant vacuum source to generate a vacuum in the dispenser sump interstitial space 365, 27, as previously discussed.

The vacuum is then passed from the output of the latching valves 380A, 380B to the pilot control valve 390 via a vacuum conduit 452. The pilot control valve 390 controls whether the vacuum level is communicated via a pilot valve vacuum conduit 456 to dedicated pilot control valves 458 (CV-2) that control whether the vacuum will be communicated to the vacuum actuator 186. The pilot control valves 458 control whether the vacuum actuator 186 keeps the product line shear valves 116 opened, since the vacuum from the pilot control valves 458 is coupled to the vacuum actuator 186 via a shear tube or conduit 176. If the pilot control valve 390 is opened to all on the vacuum level to be communicated to the dedicated pilot valves 458, the vacuum level will rejoin its origination at the output of the operability valve 430 via a vacuum conduit 461.

Thus, in summary the pneumatic system of FIG. 15 directs a vacuum level generated by a vacuum-generating source in the product line interstitial space 111, 123 to (1) components that determine if a blockage exists in the interstitial space 365 (end-of-zone switch 376), (2) redundantly controlled latching valves 380A, 380B to generate a vacuum in the dispenser sump interstitial space 365, 232: and (3) to a pilot control valve 390 that directs and controls the vacuum level in order to actuate and open the product line shear valves 116. In this manner, a sufficient vacuum will have to be established first in the product line interstitial space 111, 123 and the dispenser sump interstitial spaces 365, 27 before a sufficient vacuum level is applied to the vacuum actuators 178. The product line shear valves 116 are purposefully designed to open last as part of the pneumatic design so that fuel 80 is not supplied until the integrity of the entire system (via monitoring for leaks in the interstitial spaces) is performed and established. As previously discussed, there are other electrical sensors and events that can also cause the pilot control valve 390 to cause the product line shear valves 116 to close for other reasons as well.

Now that the vacuum path for the system has been discussed for establishing a vacuum level to monitor for leaks of the fuel-handling components, a detailed discussion of the pneumatic components and their operation and control of the vacuum is now discussed.

As illustrated in FIG. 15, the product line operability valve 430 is coupled inline in the internal fuel dispenser piping 123 on the outlet of the product line shear valve 116. The product line operability valve 430 is a manually-controlled valve used to control and allow vacuum generated in the product line interstitial space 123 to be used to supply vacuum to the fuel dispenser 10, and in more particular the dispenser sumps 24, 360, and the vacuum actuator 186 to open the product line shear valves 116 when no leak exists. When the product line operability valve 430 is not actuated, it is open (N.O. path). In this manner, the vacuum level generated in the product line interstitial space 123 is coupled to the vacuum conduit 431, through the filter 438 and to the vacuum conduit 442. The product line operability valve 430 is open unless manually actuated and closed (N.C. path).

The product line operability valve 430 is closed when an operability test is desired to be performed by service personnel. The operability test allows verification of the operation of the end-of-zone switches 376 as well as the vacuum actuated product line shear valves 116. When closed, the vacuum level from the product line interstitial space 123 is isolated from the dispenser sumps 24, 360 and the vacuum actuator 186 of the product line shear valves 116. The vacuum present in the vacuum conduit 431 is vented to atmosphere via an operability vent 432. This loss of vacuum causes a loss of vacuum in the vacuum flow path of the vacuum conduit 442, which will be detected by the end-of-zone switch 376 and communicated to the tank monitor 168. Further, the loss of vacuum causes a leak to be detected by the pressure transducer 386. The tank monitor 168 can then ensure the end-of-zone vacuum switches 376 are working properly. Further, the tank monitor 168 will cause the pilot control valve 390 to pneumatically cause a loss of vacuum to be communicated to the dedicated pilot valves 458 to close the product line shear valves 116 as will be discussed in more detail below. Thus, service personnel can verify the correct operation of the end-of-zone switches 376 and closing of the product line shear valves 116 when the operability valve 430 is actuated.

A vapor line operability valve 434 is also provided for the vapor line monitored interstitial space 145, 139 just like the operability valve 430 for the product lines 111, 123. The actuation of vapor line operability valve 434 is just like that of the product line operability valve 430.

Because the operability valves 430, 434 are mapped on a one-to-one relationship with the end-of-zone vacuum switches 376, 381, the operability valves 430, 434 provide a convenient method to assist installation personnel in correctly mapping the tank monitor 168 to the correct end-of-zone vacuum switches 376, 381. It is important for the tank monitor 168 to correctly associate the end-of-zone switches 376, 381 so that a blockage can be detected and identified in the correct product and vapor line interstitial space 123, 139.

The product line operability valve 430 can also be used to manually shut off the product line shear valves 116 for any other purpose desired by service personnel. When service personnel desire to put the system back into operation, service personnel need only release the operability valve 430 actuation. Thereafter, the vacuum-generating source will eventually generate a sufficient vacuum, if no leaks are present, to automatically open the product line shear valves 116 via the vacuum actuator 186 previously described. This is an improvement over prior shear valve systems where a linkage on the shear valve had to be manually reset to open the flow path inside the shear valve, thus providing for a greater possibility of damaging the shear valve.

As the vacuum level increases in the vacuum conduits 442, 446, the end-of-zone switches 376, 381 will be actuated at a designed vacuum level. The end-of-zone switches 376, 381 are vacuum switches that monitor vacuum pressure. The switches 376, 381 have a fixed vacuum level set point and will actuate from a normally open position (N.O.) to a normally closed (N.C.) position upon the vacuum level reaching the set point. The set point may be set to actuate at −3.5 psi with a +/−5% for example.

The end-of-zone switches 376, 381 will actuate from the N.C. to the N.O. position when the vacuum levels decrease slightly from the set point of the switches 376, 381. The tank monitor 168 will poll the end-of-zone switches 376, 381, via the tank monitor-powered microcontroller 413, to know that a sufficient vacuum level has been established to the vacuum paths of the system.

After the tank monitor 168 ensures that a sufficient vacuum is drawn by use of the end-of-zone switches 376, 381, the tank monitor 168 will control the correct latching valve 380A, 380B to open the vacuum flow path to be coupled to vacuum conduit 448 so that the vacuum-generating source can begin to draw a vacuum in vacuum conduit 450 coupled to the dispenser sump interstitial spaces 365, 27. The tank monitor 168 employs an algorithm to determine which latching valve 380A, 380B is to be opened and which is to be closed. In one embodiment, the latching valves 380A, 380B are solenoid valves that contain a shuttle mechanism that toggles between an open and closed state and does not require constant power to stay engaged in either position. The inductance of the solenoid coil can be measured as part of the tank monitor 168 polling cycle to determine if the latching valves 380A, 380B are opened or closed. The tank monitor 168 can then actuate the latching valves 380A, 380B to an open or closed position as desired. In this manner, the tank monitor 168 is able to control the latching valves 380A, 380B to ensure that a redundant source of vacuum is available to generate a vacuum level in the dispenser sump interstitial space 365, 27 and the rest of the system, even if one of the dispenser product lines 118 that is tapped off of to provide the vacuum source contains a leak. Again, the end-of-zone switches 376 allow the tank monitor 168 to know if a particular product line 118 can provide a sufficient vacuum to make this decision.

Note that "Product Line C" (118) and "Vapor Recovery D" (134) do not interface to a latching valve 380. This is because these lines are not used as a vacuum source for the rest of the system. However, end-of-zone switches 376, 381 are still provided to ensure that a sufficient vacuum level is generated to the end of these product line and vapor line interstitial spaces 123, 139 as part of the leak monitoring system. These end-of-zone switches 379, 381 are also monitored by the tank monitor 168. The tank monitor 168 will cause the pilot control valve 390 to close thereby causing a loss of vacuum to the vacuum actuator 186 to close product line shear valves 116 if a sufficient vacuum cannot be established to the end of the monitored interstitial space lines 123, 139, due to either a leak or blockage.

Once the system has a sufficient vacuum level, the tank monitor 168 will open one of the latching valves 380A, 380B to begin to generate a vacuum in the dispenser sump interstitial spaces 365, 27. The tank monitor 168 monitors the pressure transducer 386 to monitor the vacuum level in the dispenser sump interstitial space 365, 27. The tank monitor 168 determines if the vacuum level in the dispenser sump interstitial space 365, 27 is at a sufficient vacuum level for monitoring of leaks. When the vacuum level is sufficient, meaning that there is no leak in the fuel dispenser sump interstitial space 365, 27, the tank monitor 168 instructs the latching valve 380A, 380B that was opened to provide the vacuum source to close, thereby isolating the dispenser sump interstitial space 365, 27 into a separate zone from the dispenser piping interstitial space 123.

The tank monitor 168 continues to poll the pressure transducer 386 for loss of vacuum. If a vacuum loss occurs in the dispenser sump interstitial space 365, 27, the tank monitor 168 opens one of the latching valves 380A, 380B to attempt to replenish the vacuum level in the dispenser sump interstitial space 365, 27. If the vacuum level is sufficient in the dispenser sump interstitial space 365, 27, this vacuum level is pneumatically communicated to the pilot control valve 390, which is dead-headed (i.e. not coupled to the pilot valve vacuum conduit 456). The pilot control valve 390 is a solenoid valve in one embodiment that is initially dead-headed in the system. The dispenser-controlled microcontroller 412 as part of the DSM 170, receives a periodic signal from the tank monitor 168 indicating the control status of the pilot control valve 390. As previously discussed, the tank monitor 168 will only indicate that the status of the pilot control valve 390 is to be opened if all other sensors and conditions do not indicate a leak, or other safety conditions previously described where it is desired to close the product line shear valves 116 is not present. The control status is stored by the dispenser-powered microcontroller 412 and is used to control the state of the pilot control valve 390. If there is no update, the dispenser-powered microcontroller 412 will energize the pilot control valve 390 to close or stay closed. If the tank monitor 168 indicates that all vacuum levels and other sensors are in a normal status, the vacuum level is continued propagating through the system towards opening of the product line shear valves 116.

Once the pilot control valve 390 is energized, the vacuum source from the vacuum conduit 452 is coupled to the vacuum conduit 456 coupled to the dedicated product line pilot valves 458. A diaphragm (not shown in FIG. 15) in the product line pilot valves 458 is opened by the vacuum power, and the pilot valve 458 is switched from the normally open (N.O) to the normally closed (N.C.) position. At this point, the vacuum level is coupled to the vacuum actuator 186 of the product line shear valves 116 via the vacuum conduit, labeled "shear tube" 176. The vacuum level will cause the product line shear valves 116, to open since the vacuum level is properly established through the entire secondarily contained space of the system. The present invention is designed to open the product line shear valves 116 last, since they control fuel flow. In this manner, the integrity of the system is determined fully before fuel flow is allowed.

Further, by the pilot valve 458 moving to the N.C. position, the pilot valve vacuum conduit 456 is also coupled to a vacuum conduit 461 at the vacuum level origination point to come around full circle. Thus, if the vacuum level in the product line interstitial spaces 123 drops below a sufficient vacuum level possibly indicating a leak or blockage, the product line shear valves 116 are closed independently of the dispenser sump interstitial space 365, 27 leak status and its operation.

If a leak or other condition occurs such that the tank monitor 168 desires to close the product line shear valves 116, the tank monitor 168 will cause the pilot control valve 390 to de-energize via the dispenser-powered microcontroller 412 in the DSM 170. This will vent any pilot pressure generated as a result of the vacuum level applied to the pilot control valve 390 through a vent 454 to atmosphere. This will cause the vacuum level to be lost in the pilot valve vacuum conduit 456 thereby causing the pilot valves 458 to pneumatically switch to the N.O. position and causing their vents 459 to open to atmosphere and the vacuum actuator 186 to lose vacuum. This in turn causes the product line shear valves 116 to close as previously discussed.

Further, any loss of vacuum in the dispenser sump interstitial space 365, 27 will also pneumatically cause the product line shear valve 116 to close irrespective of the tank monitor 168. This is because the vacuum actuator 186 of the product line shear valve 116 receives its vacuum via vacuum conduit 448, 452, which also supplies the vacuum to the dispenser sump interstitial space 365, 27.

Also, the shear tube 176 may be designed to assist in the detection of an impact to the fuel dispenser 10 to cause the product line shear valves 116 to close if the product line shear valve 116 does not shear properly. The shear tube 176 may be constructed out of a rigid material as opposed to a flexible material. For example, the shear tube 176 may be constructed out of glass or other delicate material that is more like to break in the event of an impact to the fuel dispenser 10. Thus, if the shear tube 176 breaks, the resulting loss of vacuum to the vacuum actuator 186 will cause the product line shear valve 116 to close automatically.

Communications Diagram

Figure 16:
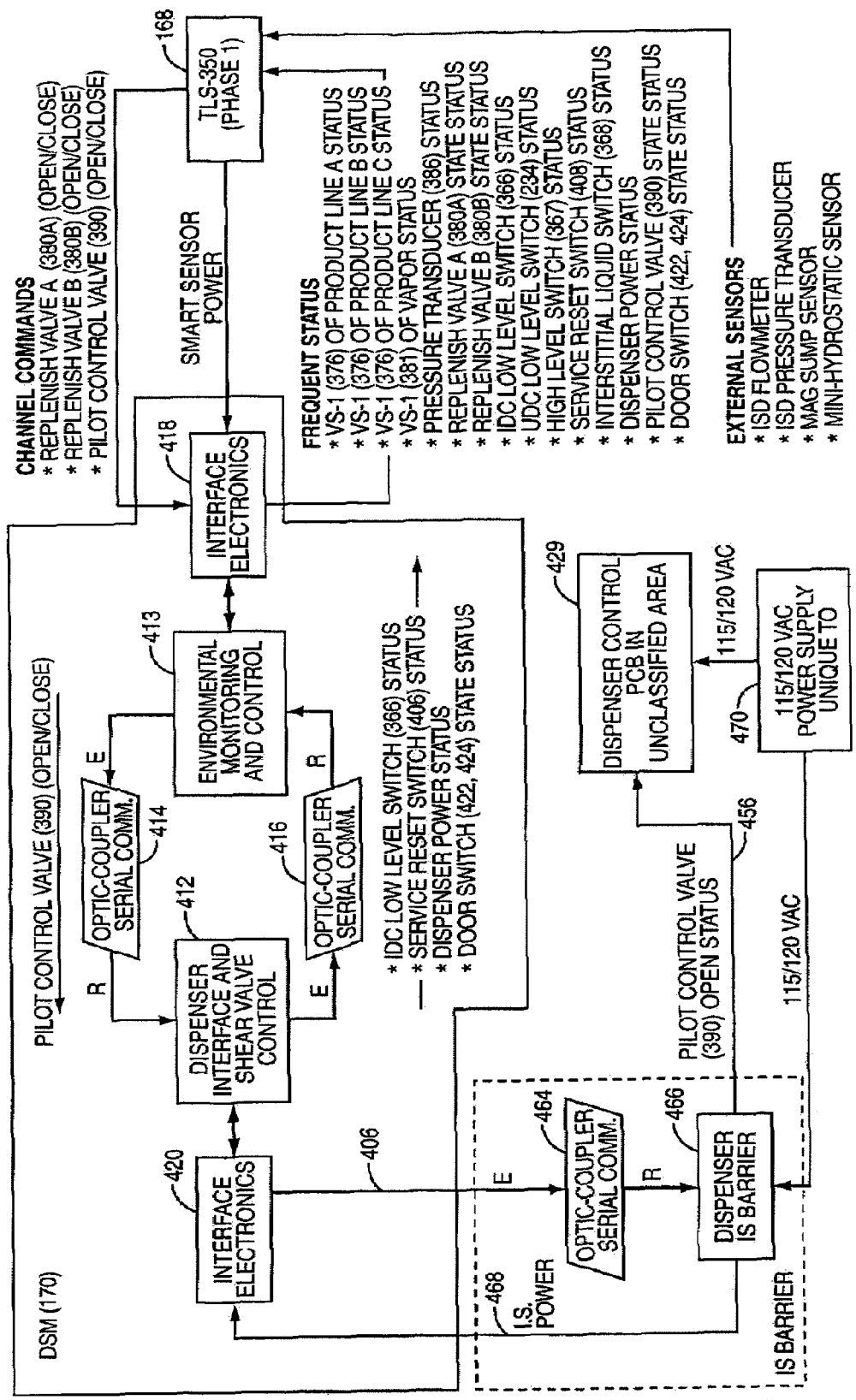
FIG. 16 is a communications diagram illustrating the operational components of the secondary containment system according to the present invention.

FIG. 16 illustrates a communications diagram of the secondary containment monitoring and control system according to the preferred embodiment. Many of the components illustrated therein have been previously described and thus will not be repeated. The DSM 170 is shown as being powered by intrinsically safe power 468 through to the fuel dispenser IS barrier 466. In this manner, the fuel dispenser 10 power, via its power supply 470, provides power to the dispenser-powered microcontroller 412 as previously discussed.

An optional feature is also shown as the pilot control valve 390 open status. This status may be communicated from the interface electronics of the dispenser-powered microcontroller 412 through an optic-coupler 464 to the dispenser IS barrier 466. From there, the signal may be communicated to a dispenser controller 429 residing within the dispenser 429. The controller 429 may be the control system 46 as illustrated in FIG. 2. This status is used to know that the product line shear valves 116 have been closed as the result of a leak or other condition as previously described. The dispenser controller 429 may use this status to generate or communicate an alarm to the site controller 68, or take other actions based on the status.

Shear Valve Controller

Figure 17:
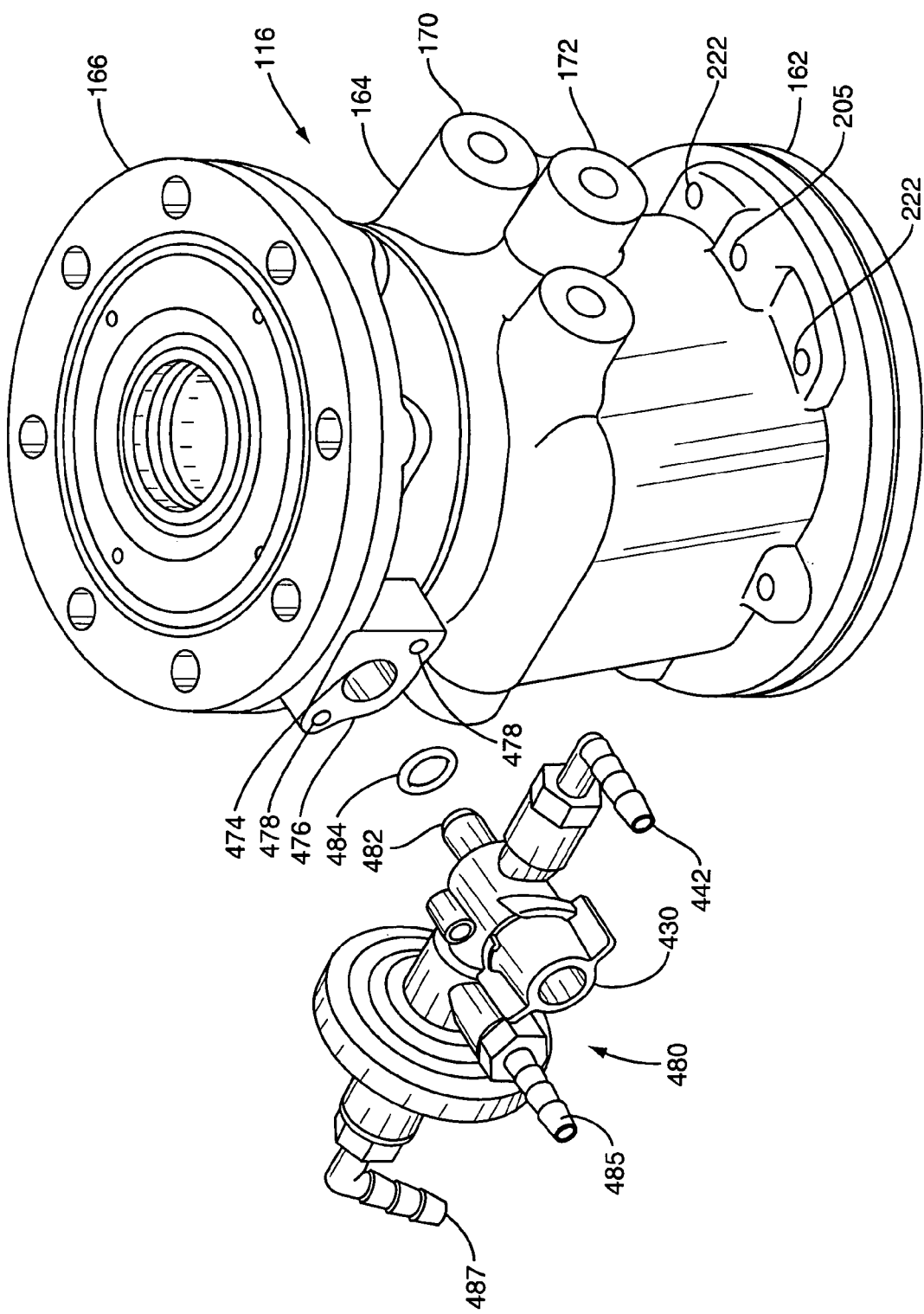
FIG. 17 is an illustration of a shear valve controller for controlling the operation of the vacuum actuated shear valve according to one embodiment of the present invention.

Because of the close pneumatic relationship between the operability valve 430 and the pilot valve 458 to couple the vacuum level from the of the fuel dispenser piping interstitial space 123 to the product line shear valve 116 and the vacuum path of the system, one embodiment of the present invention provides a shear valve controller than incorporates both of these components in a common mechanical package. This shear valve controller 480 is illustrated in FIG. 17. The shear valve controller 480 contains both the operability valve 430 and the pilot valve 458. The shear valve controller 480 contains a port 482 that is designed to couple to the interstitial space of the double-walled product line shear valve 116. This provides a convenient method of coupling the shear valve controller 480, and more particularly the operability valve 430 and pilot valve 458 therein, to the fuel dispenser piping interstitial space 123 to receive the vacuum as previously described. This is because the interstitial space of the double-walled shear valve is fluidly coupled to the fuel dispenser piping interstitial space 123 when connected, as illustrated in FIGS. 4-6.

The product line shear valve 116 contains an orifice or port 474 on a finished surface 476 that is bored through the containment housing 164 and is fluidly coupled to the interstitial space (not shown) of the product line shear valve 116 therein. The vacuum source port 482 is coupled through an O-ring 484, which provides a seal between the shear valve controller 480 and the finished surface 476 of the product line shear valve 116. Mounting orifices 478 are provided on the finished surface to accept fasteners from the shear valve controller 480 to securely attach the shear valve controller 480 to the product line shear valve 116.

The shear valve controller 480 also provides other ports to couple the operability valve 430 and the pilot valve 458 to various flow paths, as illustrated in the pneumatic diagram of FIG. 15. A vacuum actuator port 485 is provided as part of the shear valve controller 480 that is designed to couple the pilot valve 458 to the shear tube 176 to provide the vacuum source to the vacuum actuator 186. The shear valve controller 480 also contains an end-of-zone valve port 442 that is designed to couple to the vacuum conduit 431 to couple the operability valve 430 to the end-of-zone switch 376. Lastly, the shear valve controller 480 contains a pilot line port 487 that is adapted to couple the pilot valve 458 inside the shear valve controller 480 to the pilot valve vacuum conduit 456 to receive the vacuum level from the pilot control valve 390. These ports 482, 487, 485, 442 may contain a barbed surface in order to securely couple to vacuum conduits as illustrated in the pneumatic diagram of FIG. 15.

Figure 18:
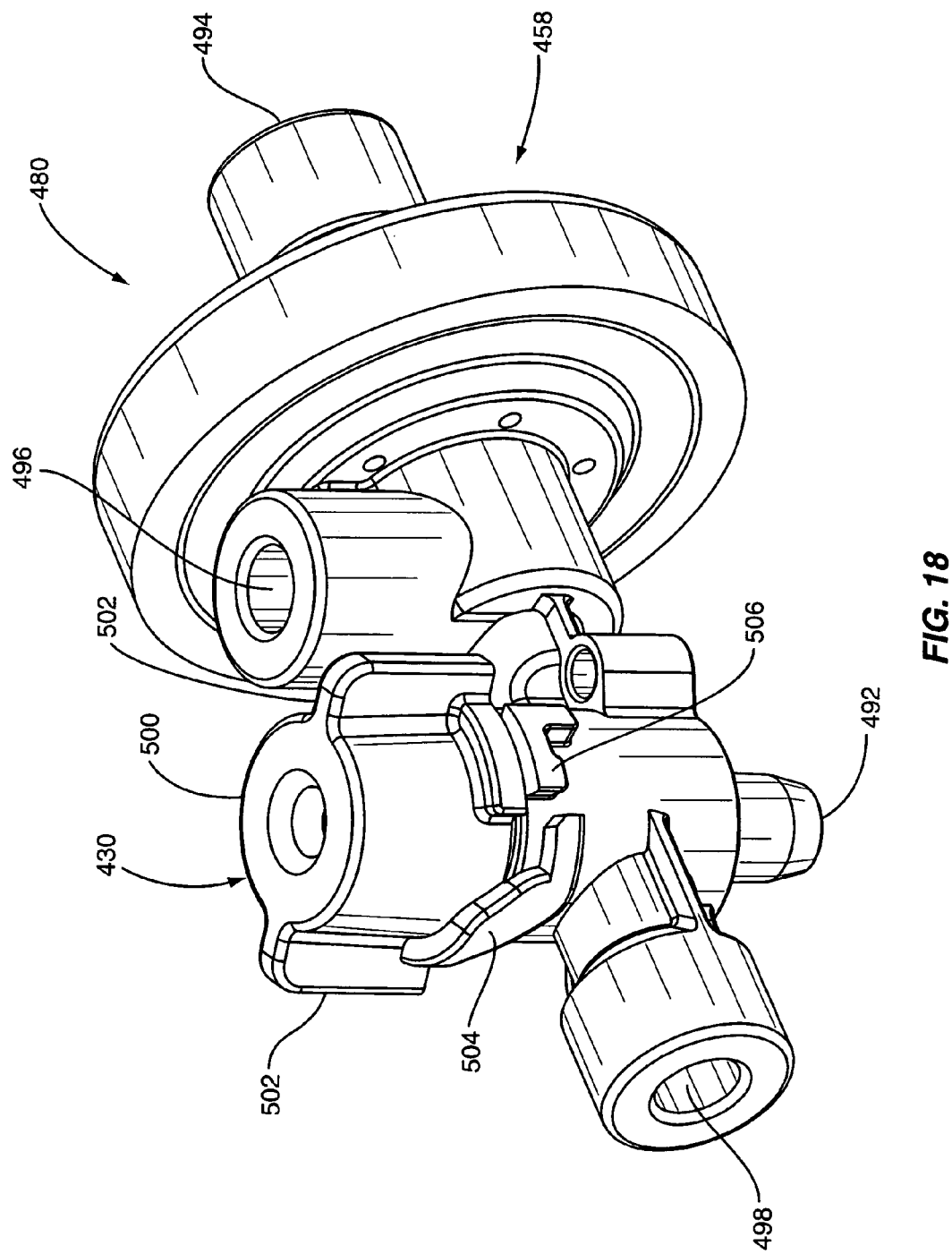
FIG. 18 is an illustration of the shear valve controller housing for the shear valve controller illustrated in FIG. 17.

FIG. 18 illustrates an exterior view of the shear valve controller 480 to introduce and describes its components. The shear valve controller 480 is comprised of a housing that is machined to provide the various internal flow paths to the operability valve 430 and the pilot valve 458 therein. The shear valve controller 480 is machined to contain a vacuum source orifice 492, a pilot valve orifice 494, a vacuum actuator orifice 496, and an end-of-zone valve orifice 498, that are adapted to receive the vacuum source port 482, the pilot line port 487, the vacuum actuator port 485, and the end-of-zone valve port 442, respectively.

The operability valve 430 contains a screw cap 500 that is designed to allow a person to manually actuate and de-actuate the operability valve 430. As previously discussed, actuation of the operability valve 430 vents the vacuum source port 482 to atmosphere, thereby causing a loss of vacuum that will in turn cause a loss of vacuum at the vacuum actuator 186 and close the product line shear valve 116. To actuate the operability valve 430, a person pushes down on the cap 500, which is spring-biased upward. This opens the vent 432 coupled to the operability valve 430 to atmosphere and causes a loss of vacuum. In order to de-actuate the operability valve 430, the manual force applied to the cap 500 is released.

The cap 500 may also contain two oppositely opposing thumb and forefinger extensions 502 to allow a person to easily twist the cap 500 back and forth. The cap 500 contains a locking mechanism 504 that engages with a locking receiver 506 when the cap 500 is twisted counterclockwise. The locking mechanism 504 can only engage with the locking receiver 506 when a downward force is applied to the cap 500 thereby actuating the operability valve 430. When engaged, this keeps the operability valve 430 actuated without a person having to continue to push downward on the cap 500. When it is desired to de-actuate the operability valve 430, the cap 500 is twisted clockwise, thereby allowing the cap 500 to be released in its upwardly biased direction thereby closing off the operability valve vent 432 to atmosphere.

Figure 19:
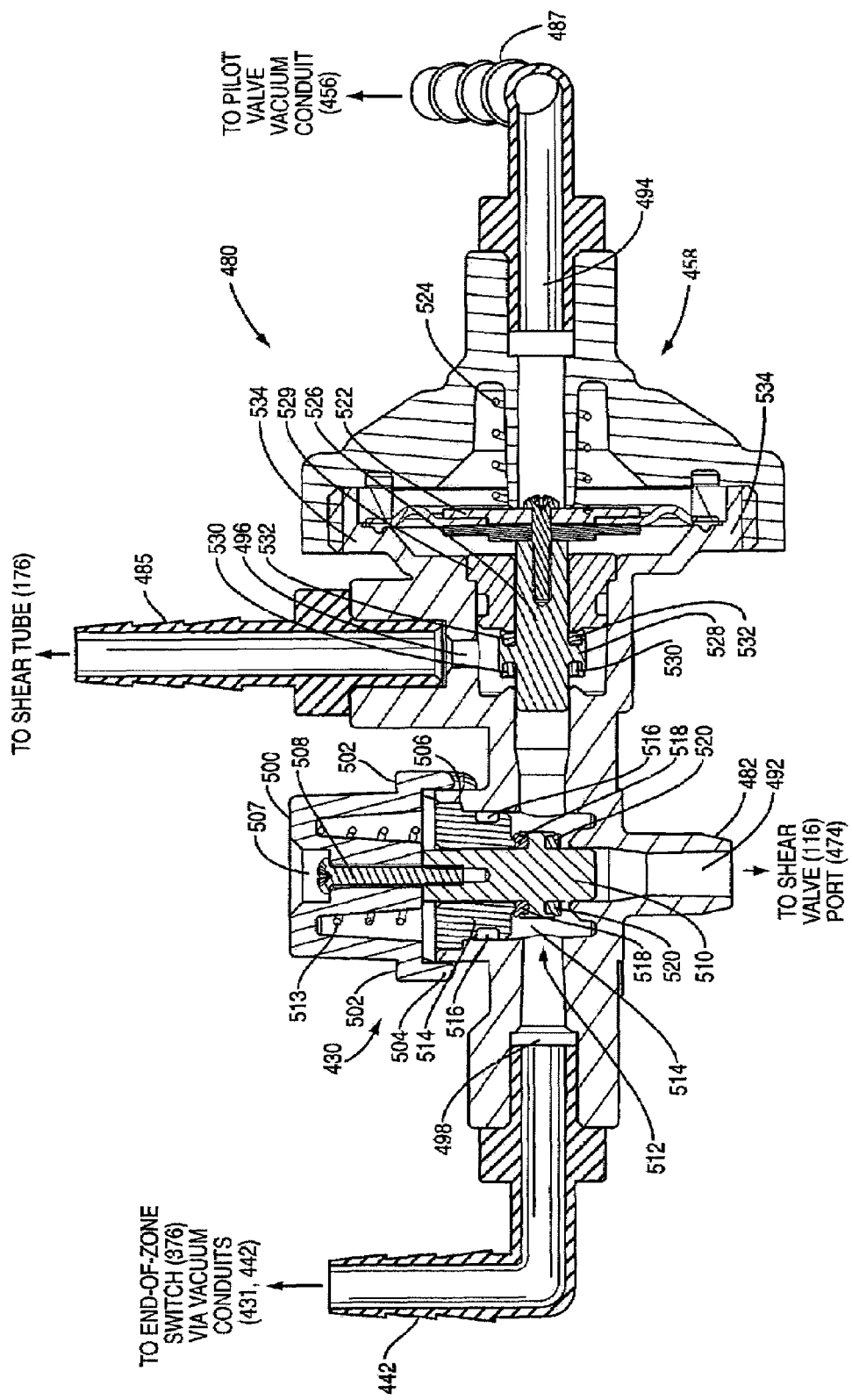
FIG. 19 is a cross-sectional illustration of the shear valve controller illustrated in FIGS. 17 and 18.

FIG. 19 illustrates a cross-section view of the shear valve controller 480 to better illustrate and describe the operation of the operability valve 430 and the pilot valve 458 to provide their functions in the pneumatic system illustrated in FIG. 15. The cap 500 contains a cap orifice 507 at the top. The cap orifice 507 is designed to allow a fastener, such as a screw 508, to fit inside the cap orifice 507 to be flush or underneath the top plane of the cap 500 and secure the cap 500 to an operability valve piston 510. The operability valve piston 510 controls the flow of air between the end-of-zone valve orifice 498 and the vacuum source orifice 492. The operability valve piston 510 contains an operability valve piston flute 512 having a piston flute top 518 and piston flute bottom 520 that moves up and down when the cap 500 is pressed and released to open and block off the end-of-zone valve orifice 498 from the vacuum source orifice 492. A cap spring 513 is placed inside and between the inside surface of the cap 500 and the top of the operability valve piston 510 so that the cap 500 is spring biased upward. The spring 513 engages with an operability valve piston plug 514 that supports the operability valve piston 510 and moves the operability valve piston 510 up and down when the operability valve piston plug 514 is moved in kind. The operability valve piston plug 514 contains a circular groove to provide for an O-ring 516 to provide a tight seal of the operability valve piston plug 514 within the inner surface of the shear valve controller 480 housing.

When the operability valve 430 is not actuated, meaning the cap 500 is not pushed down, the piston flute top 518 rests against the operability valve piston plug 514 to provide a flow path between the end-of-zone valve orifice 498 and the vacuum source orifice 492. This allows a vacuum source applied to the vacuum source orifice 492 to also be applied to the end-of-zone switch 376 and on to the dispenser sump 24, 360 as previously discussed and illustrated in FIG. 15. When the operability valve 430 is actuated, meaning the cap 500 is pushed down, the bottom of the piston flute bottom 520 rests against and blocks off the vacuum source orifice 492. At the same time, the piston flute top 518 moves down and off the operability valve piston plug 514 and thus allows outside air to vent into the end-of-zone valve orifice 498. This will cause a loss of vacuum that will be seen by the end-of-zone switch 376, and thus the tank monitor 168 to in turn take the steps to eventually close the product line shear valve 116 as previously discussed.

The right hand side of the shear valve controller 480 illustrated in FIG. 19 is the pilot valve 458 that controls the application of vacuum from the pilot valve vacuum conduit 456 coupled to the pilot valve orifice 494 to the vacuum actuator 186 via the vacuum actuator orifice 496. In this manner, the vacuum source controlled by the pilot control valve 390 is pneumatically communicated to the pilot valve 458, which in turn actuates to pneumatically communicate the vacuum to the vacuum actuator 186. The pilot valve 458 is comprised of diaphragm 522 and a diaphragm spring 524. The diaphragm spring 524 pushes the diaphragm 522, which in turn pushes to the left on a pilot valve piston 526 having a pilot valve piston flute 528. The pilot valve piston 526 is supported by a pilot valve piston plug 529 similar to the operability valve piston 510. The pilot valve piston flute 528 contains a pilot valve piston flute left section 530 and a pilot valve piston flute right section 532. When the diaphragm 522 is pushed by the diaphragm spring 524 to the left, thereby applying a leftward force against the pilot valve piston 526, the pilot valve piston flute left section 530 is pushed against the opening between the vacuum actuator orifice 496 and the end-of-zone valve orifice 498 and the vacuum source orifice 492. Any vacuum that was inside the vacuum actuator orifice 496 is vented through the pilot valve piston flute 528 through a series of holes (not shown) in the diaphragm base 534 to vent to atmosphere and release the vacuum actuator 186 thereby closing the product line shear valve 116.

When a sufficient vacuum is applied to the pilot valve orifice 494 as a result of a vacuum level generated and passed by the pilot control valve 390 to the pilot valve conduit 456, this vacuum level will pull the diaphragm 522 to the right against its spring 524 biasing. This in turn will pull the pilot valve piston 528 and the pilot valve piston flute section 530, 530 to the right. This closes off the vent to atmosphere though the diaphragm base 534 and the coupling of the vacuum actuator orifice 496 to the vacuum source orifice 492 if the operability valve 430 is not actuated to block of the flow path and vent the vacuum actuator orifice 496 to atmosphere. In this manner, the vacuum level applied to the vacuum actuator orifice 496 is applied to the vacuum actuator 186, which will in turn open the product line shear valve 116 since vacuum levels are established and are being maintained.

Thus, the shear valve controller 480 provides a convenient method of accomplishing the pneumatic functions of the operability valve 430 and the piston valve 458 in a convenient package. However, note that the shear valve controller 480 is not a requirement to accomplish the present invention.

Those skilled in the art will recognize improvements and modifications to the preferred embodiments of the present invention. All such improvements and modifications are considered within the scope of the concepts disclosed herein and the claims that follow.

We claim:

1. A redundant vacuum source system for generating a vacuum level in a fuel-handling component interstitial space to monitor for leaks, comprising:
    a fuel-handling component surrounded by the fuel-handling component interstitial space;
    a first vacuum level source coupled to an input of a first control valve;
    a second vacuum level source coupled to an input of a second control valve;
    a common vacuum conduit coupled to an output of both the first control valve and the second control valve, wherein the common vacuum conduit is coupled to the fuel-handling component interstitial space; and
    a control system coupled to the first and second control valves, to open only one of either the first control valve or the second control valve so that only either the first vacuum level source or the second vacuum level source is coupled to the fuel-handling component interstitial space to generate a vacuum level in the fuel-handling component interstitial space.

2. The system of claim 1, wherein the first control valve and the second control valve are solenoid-controlled latching valves.

3. The system of claim 1, wherein the control system closes the first control valve and opens the second control valve to couple the second vacuum level source to the fuel-handling component if the vacuum level in the first vacuum level source cannot be generated.

4. The system of claim 1, wherein the control system closes the second control valve and opens the first control valve to couple the first vacuum level source to the fuel-handling component if the vacuum level in the second level vacuum source cannot be generated.

5. The system of claim 1, wherein the control system closes both the first control valve and the second control valve when the vacuum level has been generated in the fuel-handling component interstitial space.

6. The system of claim 1, further comprising a pressure sensor fluidly coupled to the fuel-handling component interstitial space and the control system, wherein the control system monitors pressure variations in the vacuum level in the fuel-handling component interstitial space to determine if the fuel-handling component has a leak.

7. The system of claim 6, wherein the control system opens one of the first control valve or the second control valve to coupled the first vacuum level source or the second vacuum level source to the fuel-handling component interstitial space, respectively, to regenerate the vacuum level in the fuel-handling component interstitial space if the vacuum level in the fuel-handling component drops below a threshold vacuum level.

8. The system of claim 1, wherein the fuel-handling component interstitial space is coupled to a vacuum-actuator that opens a shear valve when the vacuum level is applied to the vacuum-actuator, wherein the shear valve is coupled inline between a main fuel piping and an internal fuel dispenser piping to carry fuel from a fuel storage tank to a fuel dispenser, such that the vacuum level in the fuel-handling component interstitial space applies the vacuum level to the vacuum-actuator to open the shear valve.

9. The system of claim 1, wherein the first vacuum level source and the second vacuum level source are generated by a vacuum-generating source.

10. The system of claim 9, wherein the vacuum-generating source is a submersible turbine pump siphon that generates the vacuum level in response to fuel flow through a submersible turbine pump.

11. The system of claim 1, wherein the control system only opens the first control valve when the vacuum level has been detected throughout the first vacuum level source.

12. The system of claim 11, wherein the control system closes the first control valve and opens the second control valve if the vacuum level has not been detected throughout the first vacuum level source, and the vacuum level has been detected throughout the second vacuum level source.

13. The system of claim 1, wherein the fuel-handling component is a dispenser sump.

14. The system of claim 13, wherein the dispenser sump is either an in-dispenser sump, or a below ground dispenser sump.

15. The system of claim 1, wherein the first vacuum level source is a first fuel piping surrounded by a first fuel piping interstitial space wherein a vacuum-generating source generates the vacuum level in the first fuel piping interstitial space.

16. The system of claim 15, wherein the second vacuum level source is a second fuel piping surrounded by a second fuel piping interstitial space wherein the vacuum-generating source generates the vacuum level in the second fuel piping interstitial space.

17. A method of providing a redundant vacuum level in a fuel-handling component interstitial space to monitor for leaks, comprising:
generating a vacuum level in a first vacuum level source that is coupled a first control valve, wherein the output of the first control valve is coupled to a fuel-handling component interstitial space surrounding a fuel-handling component;
generating a vacuum level in a second vacuum level source that is coupled a second control valve, wherein the output of the second control valve is coupled to the fuel-handling component interstitial space to form a common vacuum conduit between the output of the first control valve and the second control valve; and
opening only one of either the first control valve or the second control valve so that only either the first vacuum level source or the second vacuum level source is coupled to the fuel-handling component interstitial space to generate the vacuum level in the fuel-handling component interstitial space.

18. The method of claim 17, further comprising closing the first control valve and opening the second control valve to couple the second vacuum level source to the fuel-handling component if the vacuum level in the first vacuum level source cannot be generated.

19. The method of claim 17, further comprising closing the second control valve and opening the first control valve to couple the first vacuum level source to the fuel-handling component if the vacuum level in the second vacuum source level cannot be generated.

20. The method of claim 17, further comprising closing both the first control valve and the second control valve when the vacuum level has been generated in the fuel-handling component interstitial space.

21. The method of claim 17, further comprising monitoring pressure variations in the vacuum level in the fuel-handling component interstitial space using a pressure sensor to determine if the fuel-handling component has a leak.

22. The method of claim 21, further comprising:
opening one of the first control valve or the second control valve to couple the first vacuum level source or the second vacuum level source to the fuel-handling component interstitial space, respectively; and
regenerating a vacuum level in the fuel-handling component interstitial space if the vacuum level in the fuel-handling component drops below a threshold vacuum level.

23. The method of claim 17, further comprising coupling the vacuum level in the fuel-handling component interstitial space to a vacuum-actuator that opens a shear valve when the vacuum level is applied to the vacuum-actuator, wherein the shear valve is coupled inline between a main fuel piping and an internal fuel dispenser piping to carry fuel from a fuel storage tank to a fuel dispenser, such that a vacuum level in the fuel-handling component interstitial space applies the vacuum level to the vacuum-actuator to open the shear valve.

24. The method of claim 17, further comprising generating the first vacuum level source vacuum level and the second vacuum level source vacuum level using a vacuum-generating source.

25. The method of claim 24, wherein the vacuum-generating source is a submersible turbine pump siphon that generates the vacuum level in response to fuel flow through a submersible turbine pump.

26. The method of claim 17, further comprising only opening the first control valve when the vacuum level has been detected throughout the first vacuum level source.

27. The method of claim 26, further comprising closing the first control valve and opening the second control valve if the vacuum level has not been detected throughout the first vacuum level source, and the vacuum level has been detected throughout the second vacuum level source.

28. The method of claim 17, wherein the fuel-handling component is a dispenser sump.

29. The method of claim 28, wherein the dispenser sump is either an in-dispenser sump, or a below ground dispenser sump.

30. The method of claim 17, wherein said generating comprises generating the first vacuum level source by generating the vacuum level in a first fuel piping surrounded by a first fuel piping interstitial space, and generating the second vacuum level source by generating the vacuum level in a second fuel piping surrounded by a second fuel piping interstitial space.

* * * * *